(12) United States Patent
Mokheimer et al.

(10) Patent No.: US 10,480,403 B2
(45) Date of Patent: Nov. 19, 2019

(54) COMBUSTOR WITH ADJUSTABLE SWIRLER AND A COMBUSTION SYSTEM

(71) Applicant: KING FAHD UNIVERSITY OF PETROLEUM AND MINERALS, Dhahran (SA)

(72) Inventors: Esmail M. A. Mokheimer, Dhahran (SA); Yinka S. Sanusi, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 336 days.

(21) Appl. No.: 15/364,299

(22) Filed: Nov. 30, 2016

(65) Prior Publication Data
US 2017/0241337 A1    Aug. 24, 2017

Related U.S. Application Data

(60) Provisional application No. 62/298,263, filed on Feb. 22, 2016.

(51) Int. Cl.
| | |
|---|---|
| *F02C 3/22* | (2006.01) |
| *F23L 7/00* | (2006.01) |
| *F23C 7/00* | (2006.01) |
| *F02C 7/224* | (2006.01) |
| *F23R 3/14* | (2006.01) |
| *F23R 3/28* | (2006.01) |
| *F23N 5/00* | (2006.01) |

(52) U.S. Cl.
CPC ............. *F02C 3/22* (2013.01); *F02C 7/224* (2013.01); *F23C 7/002* (2013.01); *F23C 7/006* (2013.01); *F23L 7/007* (2013.01); *F23N 5/003* (2013.01); *F23R 3/14* (2013.01); *F23R 3/28* (2013.01); *F23R 3/286* (2013.01); *F23C 2900/07001* (2013.01); *F23D 2900/14701* (2013.01); *Y02E 20/344* (2013.01)

(58) Field of Classification Search
None
See application file for complete search history.

(56) References Cited

U.S. PATENT DOCUMENTS 6,293,084 B1 * 9/2001 Drnevich ............... B01D 53/22
                                                          60/39.17
7,927,568 B2    4/2011 Fan et al.
(Continued)

FOREIGN PATENT DOCUMENTS

| EP | 2 613 086 A2 | 7/2013 |
|---|---|---|
| EP | 2 706 294 A1 | 3/2014 |

*Primary Examiner* — Lorne E Meade
*Assistant Examiner* — Thuyhang N Nguyen
(74) *Attorney, Agent, or Firm* — Oblon, McClelland, Maier & Neustadt, L.L.P.

(57) ABSTRACT

A combustor having an ion transport membrane therein and an adjustable swirler, which is mechanically connected at an inlet of a combustion zone of the combustor; a combustion system comprising the combustor, a feedback control system adapted to adjust swirler blades of the combustor based on a compositional variation of a fuel stream, and a plurality of feedback control systems to control operational variables within the combustor for an efficient oxy-combustion; and a process for combusting a fuel stream via the combustion system. Various embodiments of the combustor, the combustion system, and the process for combusting the fuel stream are disclosed.

15 Claims, 13 Drawing Sheets

(56) References Cited

U.S. PATENT DOCUMENTS

| | | | | |
|---|---|---|---|---|
| 7,985,053 B2* | 7/2011 | Schott | | F01D 9/04 |
| | | | | 416/223 A |
| 8,117,822 B2* | 2/2012 | Habib | | F02C 3/22 |
| | | | | 60/39.181 |
| 8,448,442 B2 | 5/2013 | Slobodyanskiy et al. | | |
| 8,590,490 B2* | 11/2013 | Habib | | F22B 1/18 |
| | | | | 122/149 |
| 9,083,016 B1* | 7/2015 | Saito | | H01M 8/0662 |
| 2004/0002030 A1* | 1/2004 | Shah | | F23L 7/007 |
| | | | | 431/12 |
| 2004/0197621 A1* | 10/2004 | Balliet | | H01M 4/92 |
| | | | | 429/427 |
| 2005/0147862 A1* | 7/2005 | Knoop | | H01M 8/04097 |
| | | | | 429/414 |
| 2006/0248898 A1* | 11/2006 | Buelow | | F23R 3/14 |
| | | | | 60/776 |
| 2007/0234735 A1 | 10/2007 | Mosbacher et al. | | |
| 2009/0220832 A1* | 9/2009 | Reiser | | H01M 8/04201 |
| | | | | 429/415 |
| 2010/0175386 A1 | 7/2010 | Haynes | | |
| 2011/0189570 A1* | 8/2011 | Perry | | H01M 8/04089 |
| | | | | 429/429 |
| 2013/0040255 A1 | 2/2013 | Shi et al. | | |
| 2013/0047607 A1* | 2/2013 | Petrovic | | F02D 21/08 |
| | | | | 60/605.2 |
| 2013/0167541 A1* | 7/2013 | Bathina | | F23R 3/14 |
| | | | | 60/738 |
| 2014/0193733 A1* | 7/2014 | Saito | | H01M 8/04014 |
| | | | | 429/436 |
| 2014/0216046 A1 | 8/2014 | Armstrong et al. | | |
| 2015/0152791 A1* | 6/2015 | White | | F02C 9/26 |
| | | | | 60/773 |
| 2016/0230585 A1* | 8/2016 | Arnold | | F01D 5/043 |
| 2016/0298851 A1* | 10/2016 | Brickwood | | F02C 9/34 |
| 2016/0363009 A1* | 12/2016 | Fetvedt | | F01K 25/103 |
| 2017/0141421 A1* | 5/2017 | Sundaram | | H01M 8/04097 |

* cited by examiner

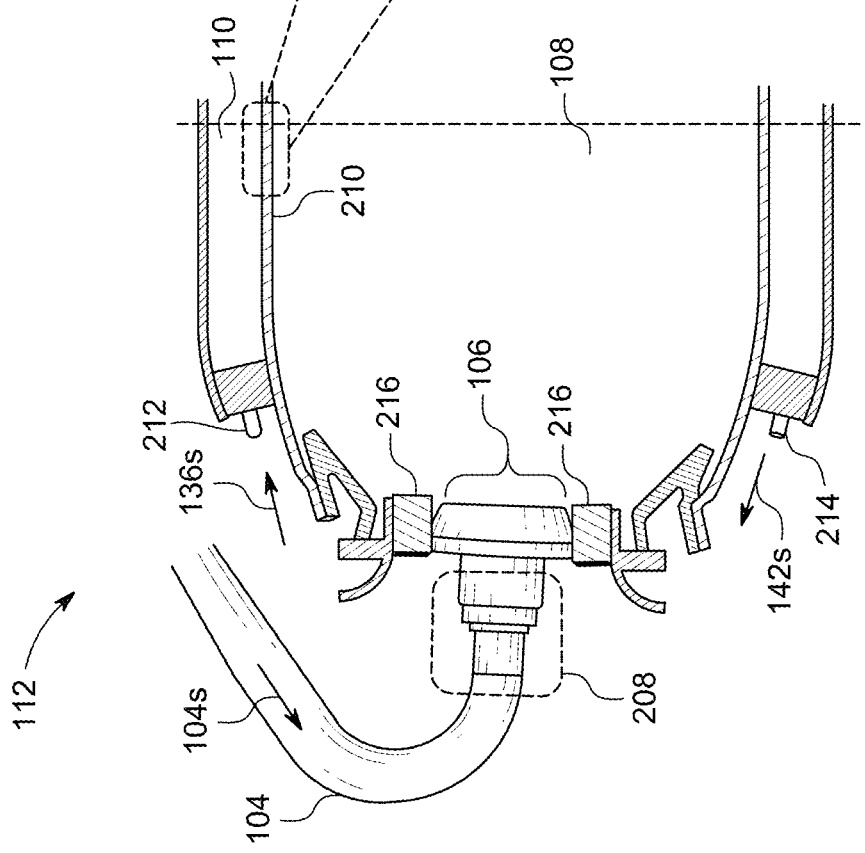
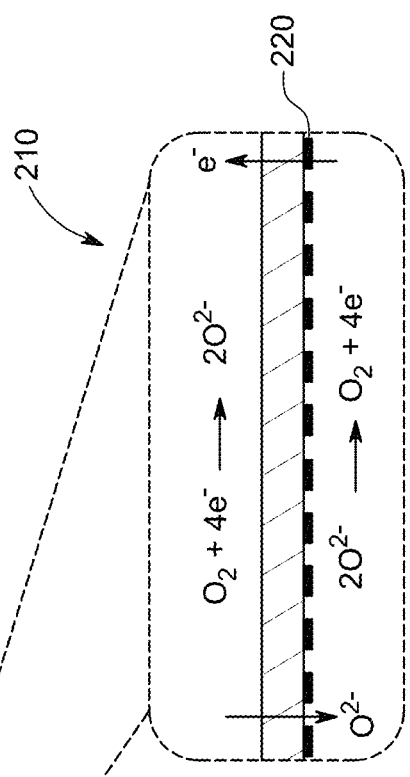
FIG. 2A
FIG. 2B

COMBUSTOR WITH ADJUSTABLE SWIRLER AND A COMBUSTION SYSTEM

CROSS REFERENCE TO RELATED APPLICATIONS

This application is based on, and claims the benefit of priority to, provisional application No. 62/298,263 filed Feb. 22, 2016, the entire contents of which are incorporated herein by reference.

BACKGROUND OF THE INVENTION

Technical Field

The present invention relates to a combustor having an ion transport membrane therein to produce molecular oxygen, and an adjustable swirler, which is mechanically connected at an inlet of a combustion zone of the combustor. Furthermore, the present disclosure relates to a combustion system and a process for combusting a fuel stream via the combustion system.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Syngas is widely used as a source of energy for industrial applications. A syngas stream can be produced via gasification of biofuels and fossil fuels (e.g. coal and heavy oil), or via reforming (e.g. catalytic reforming) of methane. Producing syngas via methane reforming powered by solar energy (i.e. solar methane reforming) can be a means for storing solar energy. Furthermore, using syngas as a fuel is in line with environmental policies adapted to reduce the carbon dioxide ($CO_2$) emission rates. However, using syngas produced via solar methane reforming is challenging. For example, solar radiation varies significantly throughout a year, or even throughout a day. These variations result in a considerable effect in the conversion rates of the fossil fuels and the composition of the produced syngas. A change in the composition of the syngas may substantially affect the thermal energy (or Wobbe index) of the syngas, thus resulting in a change in heat release rate, a change in emission rate, and a change in stability of the combustor.

In order to efficiently extract the energy of a syngas stream produced via solar methane reforming, an adjustable system is needed to continuously adjust itself based on the variations of the fuel composition (i.e. syngas). On the other hand, the system should include a controller to stabilize the combustion conditions. The controller adjusts the system based on the variations in the fuel composition of the syngas stream.

To reduce the greenhouse gas emissions, several approaches have been adapted to effectively capture carbon dioxide. These approaches are either post-combustion, pre-combustion, or oxy-combustion. The prior art reference U.S. Pat. No. 7,927,568 B2 describes a capturing procedure that optimizes the $CO_2$ cooling duty and compression power. Researchers are more interested in oxy-combustion approaches as a more promising way of recovering and capturing carbon dioxide from flue gases. In addition, oxy-combustion also serves as means of addressing other environmental concerns such as elimination of NOx emissions. The oxy-combustion involves burning a fuel in pure oxygen or a mixture of oxygen and carbon dioxide. Separation of oxygen from an oxygen-containing mixture (e.g. air) can be obtained, for example, via an ion transport membrane. The ion transport membrane provides a selective permeation of oxygen. The prior art reference US005534471A describes a superior oxygen separation rate (i.e. oxygen flux through the membrane) via a surface catalyzed ion transport membrane. Accordingly, an air stream was maintained at a temperature in the range of 700° C. and 1100° C., for an effective permeation of oxygen. The prior art reference U.S. Pat. No. 8,114,193 B2 demonstrated an effective oxygen separation from air using a plurality of ion transport membrane (ITM) modules that are arranged in series in a pressure vessel. To achieve the permeation temperature, the membrane may have been thermally coupled to the combustor. The US patent application 20140216046 A1 described an integration of ion transport membrane (ITM) oxygen separation systems with a gas turbine combustor to reduce a $NO_x$ emission during the operation of the combustor. The integration is such that oxygen directly permeates into the combustion zone of the combustor, while a non-permeated portion (oxygen depleted air) may either be premixed with the fuel and air, may be used as a diluent to control a $NO_x$ emission rate, or may be used as a coolant for combustor liner cooling. In another US patent application US 2014/0174329 A1 a means of controlling reaction temperatures of an ion transport membrane reactor is described via a thermally conductive plate. Furthermore, the patent reference U.S. Pat. No. 6,565,632 B1 related to a structural support disposed within a tubular ion transport membrane to prevent inward collapse of the membrane under excessive pressures. Additionally, the prior art reference EP 2,613,086 A2 disclosed a variable swirler assembly comprising a fixed and a movable blade to extend the operating range for gas turbines running on various fuels. Accordingly, the blade angles have to be set before running the turbine to give enough safety margins for a reliable operation. The system, as described in this reference, does not continuously adjust itself based on the variations of syngas composition. Furthermore, the system does not appear to mention the use of an ITM to produce pure oxygen for oxy-combusting a fuel.

The oxy combustion of syngas obtain from solar methane reforming provides a new route for an emission-free system. The emissions from such systems are mainly carbon dioxide and water vapor. The water vapor can be condensed and a relatively pure carbon dioxide can be captured. As a result, the costs associated with post-combustion or pre-combustion treatments to capture $CO_2$ are either eliminated or at least substantially reduced. Having an ITM integrated to a combustor provides a continuous supply of pure oxygen for an oxy-combustion process. The oxy-combustion process is generally carried out at a relatively high temperature, and thus produces high temperature products. As a result, a recycle stream may be needed (e.g. a portion of the flue/exhaust gas) to be mixed with the fuel stream to keep the temperature of the combustion within an allowable temperature range.

The main challenge in the design of such systems is the adaptability of the system to compositional changes of the fuel. In addition, issues such as controlling the flow rate of the fuel to be in the stoichiometric ranges with the permeated oxygen, or controlling the flow rate of the recycling exhaust gas based on its temperature need to be addressed to avoid major thermal and/or mechanical stresses on the system. While an integration of an ITM combustor to a gas turbine has been disclosed in the prior art, an ITM-combustor having an adjustable swirler, which is connected to a feedback control system, for an efficient oxy-combustion does not appear to be disclosed previously.

In view of the forgoing, one objective of the present disclosure relates to a combustor having an ion transport membrane therein to produce molecular oxygen, and an adjustable swirler, which is mechanically connected at an inlet of a combustion zone of the combustor. Furthermore, the present disclosure relates to a combustion system having the combustor, a feedback control system adapted to adjust the swirler blades based on the compositional variations of a fuel stream, and a plurality of feedback control systems to control operational variables (i.e. temperature, flow rate, pressure, etc.) within the combustor for an efficient oxy-combustion. The present disclosure also relates to a process for combusting a fuel stream via the combustion system.

BRIEF SUMMARY OF THE INVENTION

According to a first aspect, the present disclosure relates to a combustor, including i) a cylindrical vessel with an internal cavity, ii) an ion transport membrane that divides the internal cavity of said vessel into a first and a second concentric cylindrical zone, wherein the first concentric cylindrical zone is a feed zone and the second concentric cylindrical zone is a combustion zone, iii) a first inlet and a first outlet located in the feed zone, and a second inlet and a second outlet located in the combustion zone, iv) a swirler that is connected to the second inlet, wherein the swirler has adjustable blades with adjustable angles.

In one embodiment, the swirler comprises a plurality of blades extending radially from a shaft, wherein each blade has a longitudinal axis and an angle of the longitudinal axis of each blade is adjustable relative to a longitudinal axis of the shaft.

In one embodiment, the angle of the longitudinal axis of each blade is adjustable in the range of 0 to 85 degrees relative to the longitudinal axis of the shaft.

In one embodiment, the combustor further includes i) a third concentric cylindrical zone which is sandwiched between the first and the second concentric cylindrical zones, defining a sweep zone, ii) a third inlet and a third outlet located in the sweep zone.

According to a second aspect the present disclosure relates to a combustion system, including i) the combustor of in accordance with the first aspect, ii) an oxygen supplier located upstream of and fluidly connected to the first inlet via a feed line for supplying an oxygen-containing stream, iii) a fuel supplier located upstream of and fluidly connected to the second inlet via a fuel line for supplying a fuel stream.

In one embodiment, the combustion system further includes an expander located downstream of and fluidly connected to the second outlet via an exhaust line for expanding an exhaust stream to generate power.

In one embodiment, the combustion system further includes a swirler control unit, including a) a first gas analyzer disposed on the fuel line configured to determine a composition of the fuel stream, b) a second gas analyzer disposed on the exhaust line configured to determine a composition of the exhaust stream, c) an actuator connected to the adjustable blades of the swirler configured to adjust an angle of the adjustable blades, d) a processor that is configured to receive a first signal from the first gas analyzer and a second signal from the second gas analyzer, and to transmit a first output signal to the actuator, wherein the swirler control unit is configured to adjust an angle of the adjustable blades based on the composition of the fuel stream and the exhaust stream.

In one embodiment, the combustion system further includes a flow control unit, including a) a first gas analyzer disposed on the fuel line configured to determine a composition of the fuel stream, b) a flowmeter disposed on the fuel line configured to determine a volumetric flow rate of the fuel stream, c) a first control valve disposed on the feed line configured to control a volumetric flow rate of the oxygen-containing stream, d) a flow controller that is configured to receive a first signal from the first gas analyzer and a flow rate signal from the flowmeter, and to transmit a second output signal to the first control valve, wherein the flow control unit is configured to control the volumetric flow rate of the oxygen-containing stream based on a composition and volumetric flow rate of the fuel stream.

In one embodiment, the combustion system further includes i) a recycle line that fluidly connects the exhaust line to the fuel line, ii) a temperature control unit, including a) a temperature sensor disposed on the exhaust line configured to determine a temperature of the exhaust stream, b) a second control valve disposed on the recycle line configured to control a volumetric flow rate of the exhaust stream, c) a temperature controller configured to receive a temperature signal from the temperature sensor, and to transmit a third output signal to the second control valve, wherein the temperature control unit is configured to control the temperature of the fuel stream based on the temperature of the exhaust stream.

In one embodiment, the combustion system further includes a mixer located upstream of the combustor and fluidly connected to the fuel line and the recycle line configured to mix the fuel stream with the exhaust stream.

In one embodiment, the combustion system further includes i) an oxygen-depleted line fluidly connected to the first outlet, ii) a primary heat exchanger disposed on the recycle line and fluidly connected to the oxygen-depleted line, wherein the primary heat exchanger is located downstream of the first outlet and upstream of the mixer, and is configured to heat exchange the exhaust stream with an oxygen-depleted stream that egresses the first outlet.

In one embodiment, the combustion system further includes i) an oxygen-depleted line fluidly connected to the first outlet, ii) a secondary heat exchanger disposed on the feed line and fluidly connected to the oxygen-depleted line, wherein the secondary heat exchanger is located upstream of the first inlet and downstream of the first outlet, and is configured to heat exchange the oxygen-containing stream with an oxygen-depleted stream that egresses the first outlet.

In one embodiment, the combustion system further includes a condenser located downstream of and fluidly connected to the expander via the exhaust line, configured to separate a liquid phase from the exhaust stream.

In one embodiment, the combustor of the combustion system further includes a) a third concentric cylindrical zone sandwiched between the first and the second concentric cylindrical zones, defining a sweep zone, b) a third inlet and a third outlet located in the sweep zone. In one embodiment, the combustion system further includes a recycle line that fluidly connects the exhaust line to the third inlet.

According to a third aspect the present disclosure relates to a process for combusting a fuel stream, involving i) combusting the fuel stream with molecular oxygen in the combustion zone of the combustor, which includes a sweep zone, to form an exhaust stream comprising water vapor and carbon dioxide, ii) delivering an oxygen-containing stream to the first inlet of the combustor, wherein molecular oxygen present in the oxygen-containing stream is transported to the sweep zone through the ion transport membrane, iii) flowing a portion of the exhaust stream into the third inlet of the combustor to sweep the molecular oxygen away from the sweep zone and to form an oxygen-enriched stream, iv) mixing the oxygen-enriched stream with the fuel stream in a mixer to form a combustion mixture, v) delivering the combustion mixture to the second inlet of the combustor, wherein the combustion mixture is expanded and/or agitated in the combustion zone via the swirler and is combusted to form the exhaust stream, and repeating the flowing, the mixing, and the delivering.

In one embodiment, the fuel stream is a syngas stream.

In one embodiment, the process further involves expanding the exhaust stream in an expander to generate power.

In one embodiment, the process further involves adjusting an angle of each blade of the swirler based on a composition of the combustion mixture.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 2A illustrates an axial cross-section of the combustor at a first end.

FIG. 2B is a magnified illustration of an ion transport membrane, and a mechanism of oxygen permeation therethrough.

DETAILED DESCRIPTION OF THE EMBODIMENTS

Figure 1A:
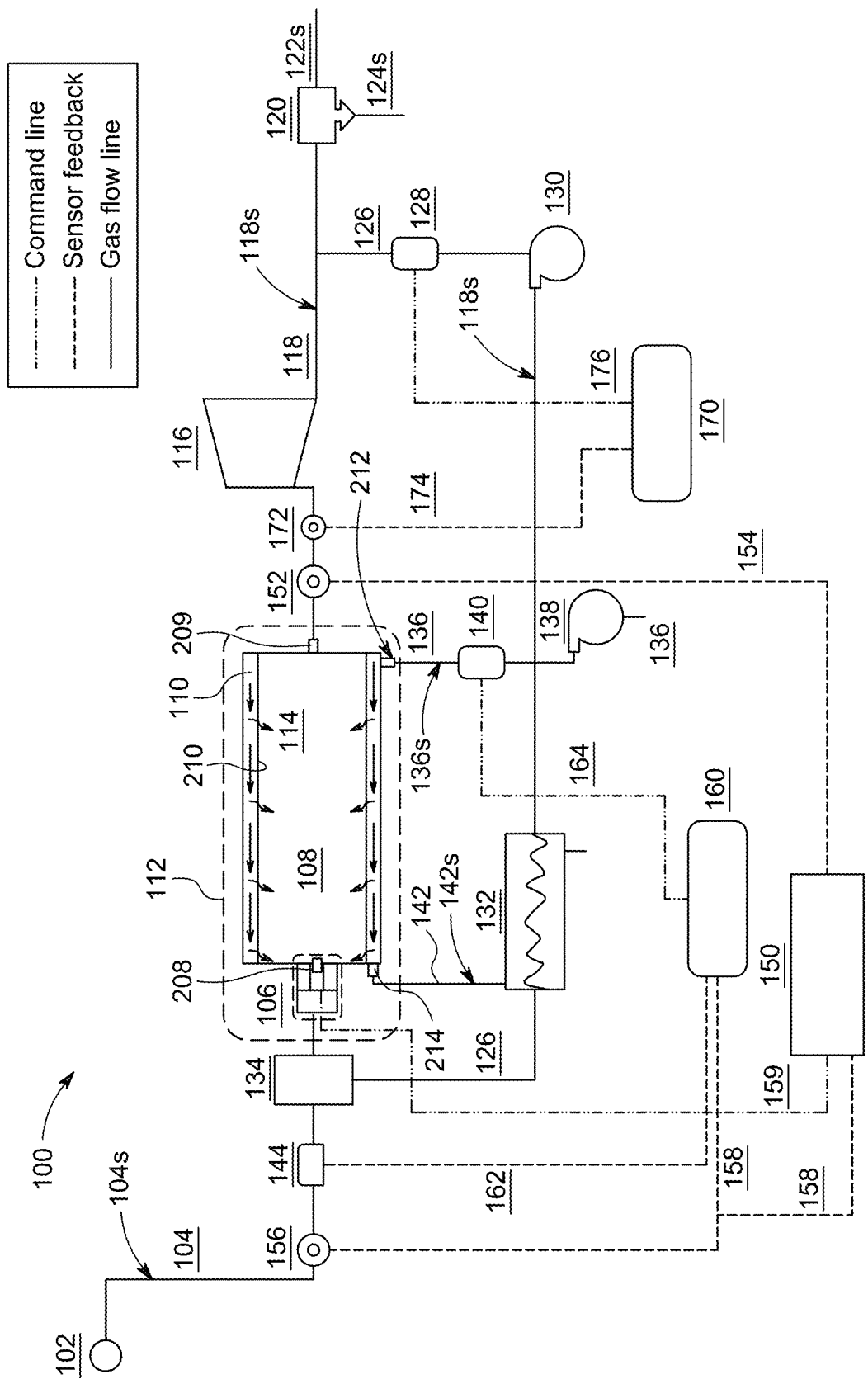
FIG. 1A is a process flow diagram of a combustion system having a primary heat exchanger configured to heat exchange an exhaust stream with an oxygen-depleted stream that egresses a first outlet of a combustor.

Referring now to the drawings, wherein like reference numerals designate identical or corresponding parts throughout the several views.

According to a first aspect the present disclosure relates to a combustor 112, including a cylindrical vessel with an internal cavity.

Figure 1B:
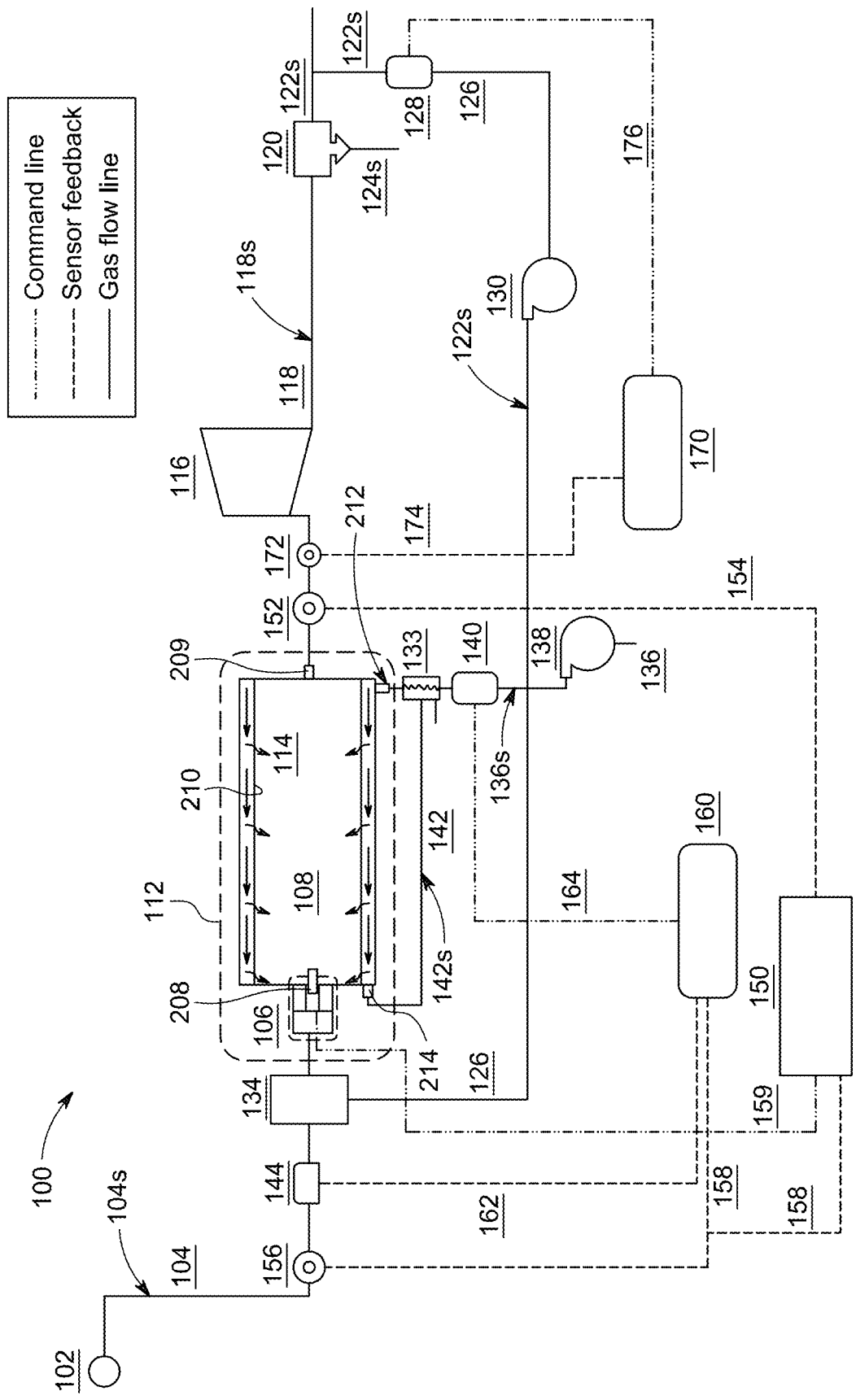
FIG. 1B is a process flow diagram of the combustion system having a secondary heat exchanger configured to heat exchange an oxygen-containing stream with an oxygen-depleted stream that egresses the first outlet.
Figure 1C:
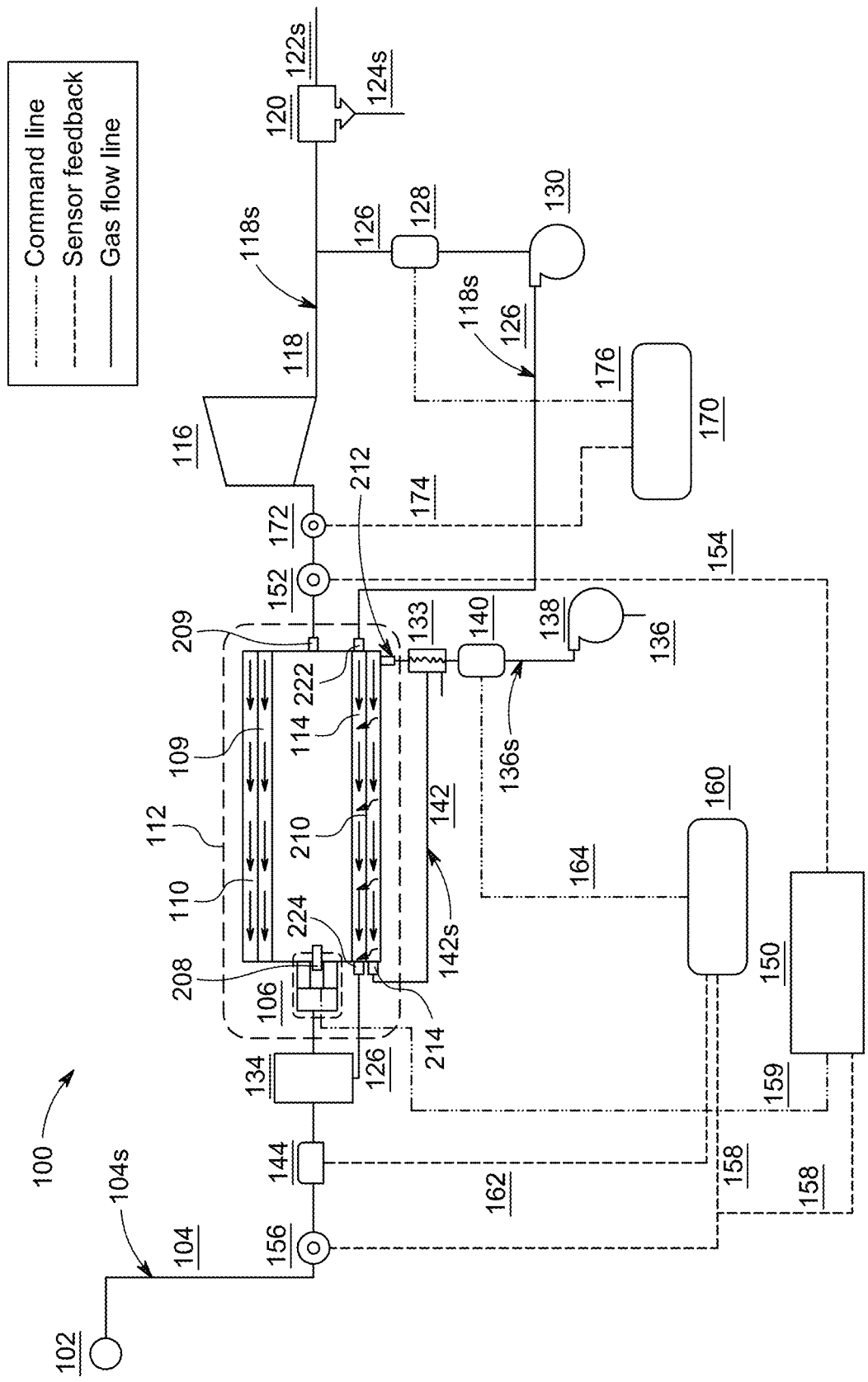
FIG. 1C is a process flow diagram of the combustion system, wherein the combustor further includes a sweep zone.

The term "combustor" refers to an apparatus or a device, wherein combustion takes place. The cylindrical vessel of the combustor 112 refers to a container having a cylindrical internal cavity that is configured to hold a gaseous mixture at elevated temperatures and pressures. For example, in a preferred embodiment, the vessel is configured to hold a gaseous mixture at a temperature in the range of 800-1,500° C., preferably 800-1,200° C., more preferably 800-1,000° C., and a pressure in the range of 1-100 atm, preferably 1-50 atm, more preferably 10-50 atm. The cylindrical vessel may be made of alumina, quartz, stainless steel, nickel steel, chromium steel, aluminum, aluminum alloy, copper and copper alloys, titanium, and the like, although the materials used to construct the cylindrical vessel are not meant to be limiting and various other materials may also be used. In one embodiment, the cylindrical vessel is made of a metal or an alloy e.g. stainless steel, nickel steel, chromium steel, copper alloys, titanium, and the like, and a lining of a ceramic material (e.g. alumina), quartz, and/or a Pyrex® is used to minimize internal surface oxidation of the cylindrical vessel. However, in a preferred embodiment, the cylindrical vessel is made of a high-temperature duty ceramic composite that can endure a temperature of up to 1,500° C., preferably up to 2,000° C., more preferably up to 2,500° C. The cylindrical vessel may have an internal volume in the range of 10-10,000 L, or preferably 100-5,000 L, or preferably 500-3,000 L, or preferably 1,000-2,000 L. The cylindrical vessel may preferably have a longitudinal axis parallel to a ground surface (as shown in FIGS. 1A, 1B, and 1C). The cylindrical vessel may be a portion of a pipe.

The combustor 112 further includes an ion transport membrane 210 that divides the internal cavity of said vessel into a first and a second concentric cylindrical zone, wherein the first concentric cylindrical zone is a feed zone 110 and the second concentric cylindrical zone is a combustion zone 108. For example, in one embodiment, the cylindrical vessel is horizontally oriented and the ion transport membrane 210 disposed therein with a longitudinal axis, which is substantially parallel to a longitudinal axis of the cylindrical vessel.

The ion transport membrane (ITM), used in the combustor 112, functions to separate oxygen from air or other oxygen-containing gaseous mixtures by transporting oxide ions (i.e. $O^{2-}$) through a material that is capable of conducting oxide ions and electrons at elevated temperatures. When a partial pressure difference of oxygen is applied on opposite sides of such a membrane, oxygen molecules ionize on one surface of the membrane and emerge on an opposite side of the membrane as oxide ions. Then the oxide ions (i.e. $O^{2-}$) recombine into molecular oxygen (i.e. $O_2$). Free electrons resulting from the combination of oxide ions will be transported back through the membrane to ionize another oxygen molecule (this concept is depicted in FIG. 2B).

The ion transport membrane 210 is a semi-permeable membrane that allows passage of oxide ions (i.e. $O^{2-}$) from the feed zone 110 to the combustion zone 108. The semipermeable membrane refers to a membrane that allows molecules or ions (in this case oxide ions) with a certain Stokes radius to pass through it by diffusion. Stokes radius of a substance in a membrane refers to the radius of a hard sphere that diffuses at the same rate as that substance through the membrane. Diffusion refers to a passage of the oxide ions through the ITM, and diffusivity is a passage rate of the oxide ions, which is determined by a differential in oxygen partial pressure on both sides of the ITM as well as a volume fraction (or a number) of oxide ion vacancies present in the ITM.

As used herein, the feed zone 110 of the combustor 112 refers to a space inside the vessel that is configured to hold an oxygen-containing gaseous mixture. Similarly, the combustion zone 108 (or permeate zone) refers to a space inside the vessel wherein a fuel stream 104s (e.g. a syngas stream) is combusted. The feed zone 110 and the combustion zone 108 are separated by the ITM 210. When an oxygen molecule present in an oxygen-containing gaseous mixture is contacted with the feed zone 110 of the ITM, the oxygen molecule may be reduced and an oxide ion (i.e. $O^{2-}$) may be formed. The oxide ions may be transported through the ion transport membrane and may be combined into molecular oxygen 114 (i.e. $O_2$) on the combustion zone 108 of the ion transport membrane. A fuel stream 104s (e.g. a syngas stream) may be combusted in the presence of the molecular oxygen 114 in the combustion zone 108 of the combustor 112.

The ITM 210 may have a composition with a general formula $A_xA'_{x'}B_yB'_{y'}O_{3-z}$, wherein each of A and A' is selected from the group consisting of Sr, Ba, La, and Ca, and each of B and B' is selected from the group consisting of Fe, Co, Cr, Ti, Nb, Mn, and Ga. Further, each of x, x', y, and y' in the general formula of the ion transport membrane has a value between 0 and 1, such that x+x'=1 and y+y'=1. Also, z is a number that varies to maintain electro-neutrality of the ITM. For example, in some embodiments, the ITM is a perovskite-type ceramic having a composition of $Ba_uBi_w$-$Co_xFe_yO_{3-\delta}$, $Ba_uCo_wFe_xNb_yO_{3-\delta}$, $Ba_uFe_xNb_yO_{3-\delta}$, $Ba_w$-$Ce_xFe_yO_{3-\delta}$, $Ba_uSr_wCo_xFe_yO_{3-\delta}$, $Ba_uTi_wCo_xFe_yO_{3-\delta}$, $Ca_uL$-$a_wFe_xCo_yO_{3-\delta}$, $Sr_uCa_wMn_xFe_yO_{3-\delta}$, $Sr_uCo_wF\ e_yO_{3-\delta}$, $La_2NiO_{4+\delta}$, $La_wCa_xFe_yO_{3-\delta}$, $La_wCa_xCo_yO_{3-\delta}$, $La_uCa_wFe_x$-$Co_yO_{3-\delta}$, $La_wSr_xCo_yO_{3-\delta}$, $La_uSr_wTi_xFe_yO_{3-\delta}$, $La_uSr_w$-$Co_xFe_yO_{3-\delta}$, $La_uSr_wGa_xFe_yO_{3-\delta}$, or $12.8La_vSr_wGa_xFe_y$ $O_{3-\delta}$—$Ba_uSr_vFe_wCo_xFe_yO_{3-\delta}$, wherein u, v, w, x, and y are each in the range of 0-1, and δ varies to maintain electro-neutrality. In another embodiment, the ITM is a perovskite-type ceramic having a composition of $La_{1-x}Sr_xCoO_{3-\delta}$ with x in the range of 0.1-0.7. In one embodiment, the ITM is doped with a metallic element selected from the group consisting of Ni, Co, Ti, Zr, and La. In another embodiment, the ITM is doped with a metallic element selected from the lanthanide group of the periodic table (i.e. metallic chemical elements with atomic numbers 57 through 71). In one embodiment, the ion transport membrane 210 includes at least one coating layer having a composition of $RBaCO_2$ $O_{5-\delta}$, wherein R is a metallic element selected from the lanthanide group (i.e. elements with atomic numbers 57 through 71) of the periodic table. Preferably R is at least one element selected from the group consisting of Pr, Nd, Sm, and Gd. In another embodiment, the ion transport membrane 210 includes pores in the size range of 0.1-10 nm, preferably 0.5-5 nm, more preferably 0.5-3 nm.

In one embodiment, a selectivity of the ion transport membrane 210 with respect to oxide ions (i.e. $O^{2-}$) is at least 90%, preferably at least 92%, more preferably at least 95%, even more preferably at least 99%. Selectivity of an ITM with respect to an ion (e.g. oxide ions) is a measure of the capability of that ITM to transport the ion (e.g. oxide ions). For example, if selectivity of an ITM with respect to oxide ions is 99%, then 99 wt % of permeated substances through the membrane are oxide ions. Selectivity of an ITM with respect to oxide ions may be determined by the size of vacancies present in the crystal structure of the ITM. Oxide ions form in a reduction reaction when molecular oxygen 114 is contacted with an ITM in the feed zone 110 and in the presence of free electrons. An ITM having a 100% selectivity with respect to oxide ions only allows the oxide ions to permeate through the membrane. In one embodiment, a selectivity of the ion transport membrane with respect to carbon dioxide, elemental nitrogen (i.e. $N_2$), water vapor, carbon monoxide, argon, and sulfur is less than 5%, preferably less than 2%, more preferably less than 1%, even more preferably less than 0.5%.

A surface area of the ITM may be in the range of 0.1 $m^2$-50 $m^2$, preferably 0.5-40 $m^2$, more preferably 1-30 $m^2$, even more preferably 10-30 $m^2$. In some embodiments, the ion transport membrane 210 has a thickness in the range of 0.5-3 mm, preferably 0.5-2 mm, more preferably 0.5-1.5 mm, whereas an oxygen flux of the ion transport membrane is within the range of 0.5-2.5 $\mu mol \cdot cm^{-2} \cdot s^{-1}$, preferably 0.5-2 $\mu mol \cdot cm^{-2} \cdot s^{-1}$, more preferably 0.7-1.5 $\mu mol \cdot cm^{-2} \cdot s^{-1}$ at a temperature in the range of 800-1,500° C., preferably 800-1,200° C., more preferably 800-1,000° C.

In one embodiment, the ITM is supported by a meshed structure 220 that covers at least a portion of a side of the ITM that faces the combustion zone. The meshed structure 220 may include rectangular, triangular, hexagonal, and/or spherical meshes having a surface area in the range of 10-500 $mm^2$, preferably 50-400 $mm^2$, more preferably 100-300 $mm^2$. The meshed structure 220 may be made of a high-temperature duty ceramic composite that can endure a temperature of up to 1,500° C., preferably up to 2,000° C., more preferably up to 2,500° C. The meshed structure 220, which is a cylindrical structure, may have a compressive strength of at least 5 MPa, preferably at least 10 MPa, more preferably at least 20 MPa, and may be utilized to prevent a collapse of the ITM due to an excessive compression in the feed zone 110.

In one embodiment, the ITM 210 is secured inside the combustor with bolts and nuts, O-rings (e.g. ceramic or metal rings), and/or gaskets 216 to prevent any leakage from outside of the combustion zone 108 to inside of same. Further, the O-rings and/or gaskets 216 may prevent any leakage from the feed zone 110 to the combustion zone 108 and vice versa.

The combustor 112 further includes a first inlet 212 and a first outlet 214 located in the feed zone 110, and a second inlet 208 and a second outlet 209 located in the combustion zone 108.

The first inlet 212 is utilized as a passage for loading the feed zone 110 with an oxygen-containing stream 136s. Similarly, the first outlet 214 is utilized as a passage for unloading the feed zone 110. In one embodiment, the first inlet 212 and the first outlet 214 are substantially similar, wherein each is a cylindrical port having an internal diameter in the range of 10-50 mm, preferably 10-40 mm, more preferably 10-30 mm, and are configured to transfer a pressurized stream having a pressure in the range of 1-50 bars, preferably 1-30 bars, more preferably 1-10 bars.

In one embodiment, the specifications of the second inlet and the second outlet are substantially similar to that of the first inlet and the first outlet, as described.

The first and the second inlets and the first and second outlets may be secured perpendicular and/or parallel to the longitudinal axis of the cylindrical vessel. For example, in a preferred embodiment, the cylindrical vessel is horizontally oriented and the ITM disposed therein is horizontally oriented, where the longitudinal axis of the ITM is substantially parallel to a longitudinal axis of the cylindrical vessel, and the first and the second inlets and first and second outlets are oriented parallel to the longitudinal axis of the cylindrical vessel. In another preferred embodiment, the first inlet and the first outlet are disposed perpendicular to the longitudinal axis of the cylindrical vessel, whereas the second inlet and the second outlet are disposed parallel to said axis.

In one embodiment, the cylindrical vessel is horizontally oriented having a first end and a second end, and the first inlet, the first outlet, and the second inlet are located on one end (for example the first end), while the second outlet is located on the opposite end (for example the second end), as depicted in FIG. 2A. In another embodiment, the first outlet and the second inlet are located on the same end (for example the first end), while the first inlet and the second outlet are located on the opposite end (for example the second end), as depicted in FIGS. 1A, 1B, and 1C. Preferably, in this embodiment, the first outlet and the second inlet may be located on the same end (for example the first end), while the first inlet and the second outlet may be located on the same end (for example the second end). Accordingly, an axial flow of the oxygen-containing stream 136s in the feed zone 110 is counter-current relative to an axial flow of the fuel stream 104s in the combustion zone 108. In an alternative embodiment, the first inlet 212 and the first outlet 214 may be located on a side wall of the vessel and perpendicular to the longitudinal axis of the vessel, while the second inlet 208 and the second outlet 209 may preferably be located on opposite ends and parallel to the longitudinal axis of the vessel.

Other than inlets/outlets designed to allow ingress and egress, the vessel may be sealed to prevent any leakage of the oxygen-containing stream 136s and/or the fuel stream 104s.

In a preferred embodiment, the combustor 112 further includes a third concentric cylindrical zone which is sandwiched between the first and the second concentric cylindrical zones, defining a sweep zone 109 (as shown in FIG. 1C). The sweep zone 109 may be configured as a section, wherein molecular oxygen 114 is collected and further be mixed with a gaseous stream (e.g. a carbon dioxide stream). Furthermore, the sweep zone 109 may protect the ITM from thermal shocks occurred within the combustion zone 108, since the ITM is not directly contacted with the combustion zone 108. According to this embodiment, the combustion zone 108 may be made of an impermeable ceramic material that can endure a temperature of up to 1,500° C., preferably up to 2,000° C., more preferably up to 2,500° C. Accordingly, the sweep zone is defined as the space between the impermeable ceramic material and the ITM, while the feed zone is defined by the ITM and an outer wall of the combustor. In this case, a recycle stream, which may be an exhaust stream, flows into the sweep zone and sweep the molecular oxygen, which has been permeated via the ITM, away from the sweep zone and into a downstream mixer, wherein the exhaust stream and the molecular oxygen are mixed with a fuel to form a combustion mixture to be fed into the combustion zone. Exemplary impermeable ceramic materials may include, but not limited to, borides, carbides, nitrides, and oxides of transition metals selected from the group consisting of Sc, Ti, V, Cr, Zr, Nb, Mo, Hf, Ta, and Th. For example, hafnium diboride ($HfB_2$), zirconium diboride ($ZrB_2$), hafnium nitride (HfN), zirconium nitride (ZrN), titanium carbide (TiC), titanium nitride (TiN), thorium dioxide ($ThO_2$), tantalum carbide (TaC), and composites thereof.

In one embodiment, the combustor 112, having the third concentric cylindrical zone, further includes a third inlet 222 and a third outlet 224 located in the sweep zone. Specification of the third inlet 222 and the third outlet 224 may preferably be substantially similar to that of the first and the second inlets and the first and the second outlets, as described. Furthermore, the third inlet 222 and the third outlet 224 may preferably be located on the opposite ends and parallel to the longitudinal axis of the vessel, to create a flow stream in the sweep zone that has a counter-current axial flow relative to an axial flow of the fuel stream 104s in the combustion zone 108 (as depicted in FIG. 1C). For example, in a preferred embodiment, the first outlet, the second inlet, and the third outlet 224 may be located on the same end (for example the first end), while the first inlet, the second outlet, and the third inlet 222 may be located on the same end (for example the second end).

The combustor 112 further includes a swirler 106 that is connected to the second inlet 208. FIG. 2A shows the combustor 112 in an axial cross-section at a first end, wherein the first and second inlets and the first outlet are disposed. A fuel stream 104s enters the combustor 112 via a fuel line 104 and is burned within the combustion zone 108 in the presence of molecular oxygen 114 to form an exhaust stream 118s. The exhaust stream 118s may further be utilized to perform work, e.g. by rotating a turbine, or operating an internal combustion engine, etc. In one embodiment, the fuel stream 104s is introduced into the combustor 112 via a fuel nozzle, which may be located at the second inlet 208. The fuel stream 104s exiting the fuel nozzle, is further expanded (or whirled) by the swirler 106 and is mixed with molecular oxygen 114 that enters the combustion zone 108 via the ITM, which may be maintained at a temperature in the range of 800-1,500° C., preferably 800-1,200° C., more preferably 800-1,000° C. As a result, the fuel stream 104s is combusted in the combustion zone 108 and forms the exhaust stream 118s. The fuel stream 104s may be in a liquid phase and/or in a gaseous phase before entering the combustion zone 108.

In an alternative embodiment, the fuel stream 104s enters the combustor 112 via a fuel line 104 and is burned within the combustion zone 108 to form an exhaust stream 118s. The exhaust stream 118s may further be recycled to the sweep zone 109 to sweep the molecular oxygen 114, which has been permeated via the ITM, away from the sweep zone. The exhaust stream 118s, which now includes the molecular oxygen 114, is fed into a mixer 134, wherein the molecular oxygen 114 is mixed with the fuel stream 104s in the presence of the exhaust stream 118s to form a combustion mixture. The combustion mixture is further delivered to the combustion zone 108.

The swirler 106 is configured to create a vortex of a fluid (e.g. the fuel stream 104s) inside the combustion zone 108, which may enhance the mixing process and may increase a flux of molecular oxygen 114 via the ITM. In the embodiment where the combustion zone is lined with the impermeable ceramic materials the swirler may improve oxy-combustion by enhancing the mixing process and increasing a residence time of the reactants (i.e. the fuel stream and the molecular oxygen) within the combustion zone.

The swirler 106 includes adjustable blades 304 with adjustable (variable) angles. Accordingly, the swirler 106 includes a plurality of blades extending radially from a shaft 302, where each blade has a longitudinal axis and an angle 312 of the longitudinal axis of each blade 310 is adjustable relative to a longitudinal axis of the shaft 308 (as shown in FIG. 3B).

In one embodiment, the adjustable blades 304 are arranged at equally spaced positions along the circumferential direction of an outer peripheral surface of the shaft 302, and are installed to extend in the axial direction of the shaft 302. The adjustable blades 304 may be configured to swirl a compressed gaseous mixture flowing through the fuel line 104 to form a swirl fluid flow in the combustion zone 108.

Figure 3A:
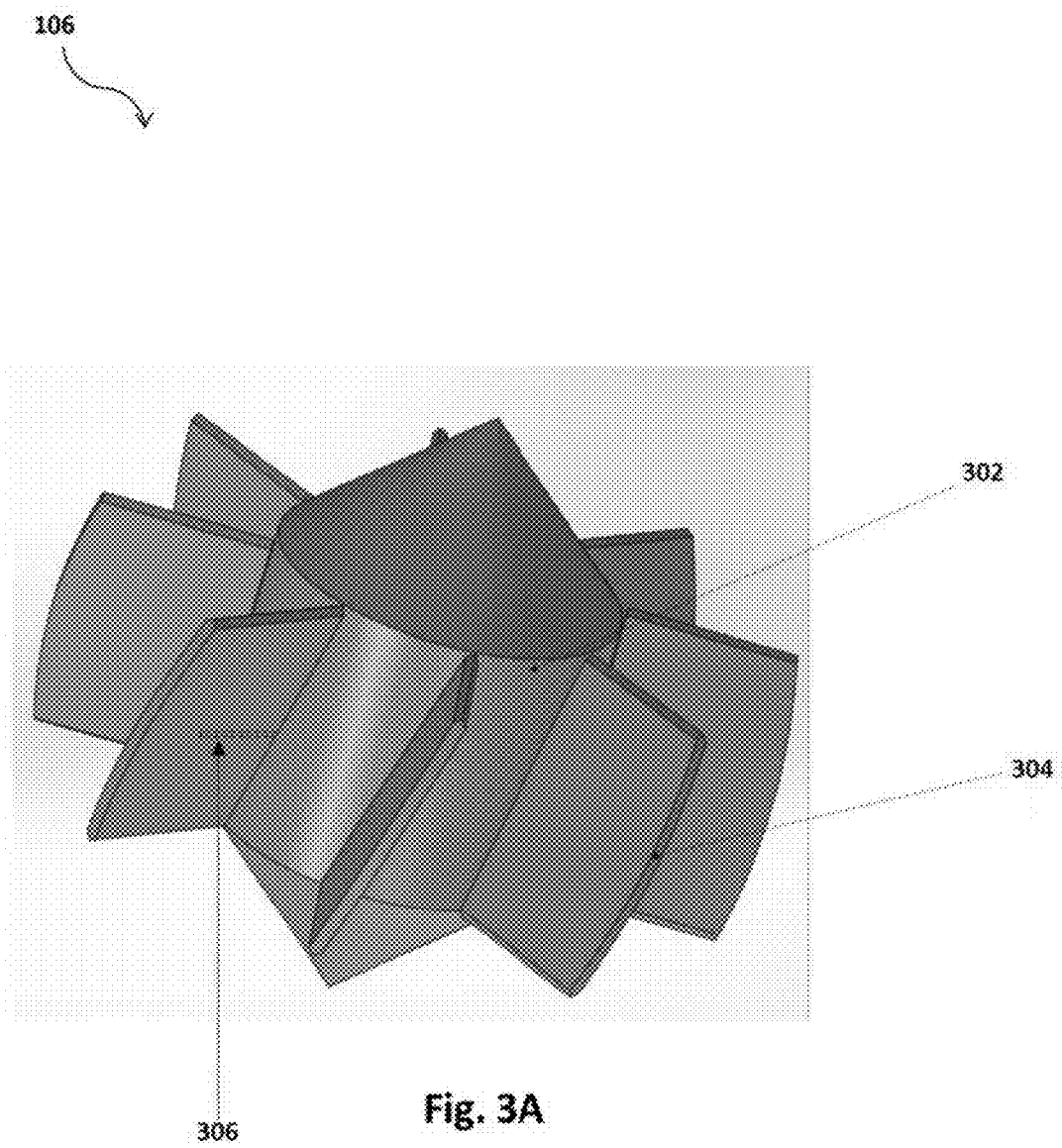
FIG. 3A illustrates an adjustable swirler in a perspective view.
Figure 3B:
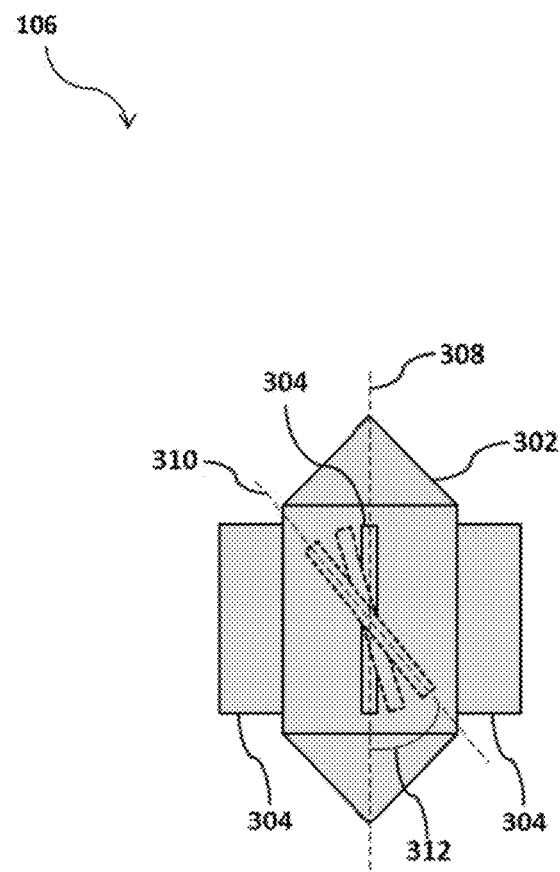
FIG. 3B illustrates the adjustable swirler in a side view.

The term "adjustable blades", as used herein, refers to blades that can be manually or automatically adjusted to a preferred angle (as shown in FIG. 3B). Further, the term "adjustable angle" refers to an angle 312 between the longitudinal axis of each blade 310 and the longitudinal axis of the shaft 308 (as shown in FIG. 3B). In a preferred embodiment, said angle is adjustable within the range of 0 to 85°, preferably 0 to 75°, more preferably 30 to 60°. Preferably, said angle may be set to a same value for each blade. Alternatively, each blade may have a different angle. In a preferred embodiment, said angle is determined according to the type of the fuel stream 104s. Preferably, said angle may instantaneously be adjusted based on variations in the composition of the fuel stream 104s during operating the combustor 112. In an alternative embodiment, a preferred angle may be set for the blades before the combustor 112 starts, and may not be further adjusted during operating the combustor 112. The preferred angle may be determined according to ambient conditions at which the combustor 112 is operating.

Said angle determines a tangential velocity of the fuel stream 104s relative to the ITM. The tangential velocity, as used here, refers to a velocity measured at any point tangent to an inner surface of the ITM. Accordingly, where the angle is set to zero, a swirl number (i.e. the ratio of the axial flux of an angular momentum to the axial flux of an axial momentum) is less than 0.3, preferably less than 0.2, and thus a tangential component of the velocity of the fuel stream is negligible, while an axial component of the velocity is maximized. In contrast, as the angle increases, the axial component of the velocity of the fuel stream decreases, while a tangential component of the velocity increases. Accordingly, where the angle is in the range of 45 to 60°, the swirl number rises to a number in the range of 0.65-1, preferably 0.7-0.95. Therefore, the swirler 106, which has adjustable blades 304, serves to control an axial velocity (or an axial momentum) of the fuel stream in the combustion zone 108 of the combustor 112 for various fuel streams. Accordingly, the swirler 106 may be capable of providing a flow stream having a high axial momentum (i.e. a low swirl number in the range of 0-0.5, preferably 0.05-0.2) in the combustion zone 108. Additionally, the swirler 106 may also capable of providing a flow stream having a high angular momentum (i.e. a high swirl number in the range of 0.65-1, preferably 0.7-0.95) in the combustion zone 108. Having a swirler 106 that creates a flow stream that has a high angular momentum (i.e. a high swirl number) is advantageous, because the fuel stream may effectively be mixed with the molecular oxygen 114, the oxygen flux of the ITM may be increased, and the residence time of the fuel stream and the molecular oxygen 114 in the combustion zone 108 may be elevated.

Preferably, the swirler 106 does not rotate around the shaft 302, and the only movable component of the swirler 106 is the adjustable blades 304 that can be adjusted to a preferred angle. However, in another embodiment, the swirler 106 rotates around the shaft 302 with a rotational speed in the range of 500-5,000 rpm, preferably 1,000-3,000 rpm. In view of that, the rotational speed may be determined according to the type of the fuel stream 104s and a flux of the molecular oxygen 114. The rotational speed of the swirler 106 may instantaneously be adjusted based on variations in the composition of the fuel stream 104s during operating the combustor 112. Alternatively, a constant rotational speed may be set for the swirler before the combustor 112 starts, and the rotational speed may not be further adjusted during operating the combustor 112. The rotational speed may also be determined according to ambient conditions at which the combustor 112 is operating.

Other than the adjustable blades 304 and the shaft 302, the swirler 106 may further include a shroud 314 to protect the blades. Furthermore, in a preferred embodiment, the shaft 302 has a hollow space and an actuator, preferably an electric motor or a pneumatic actuator, is secured inside the hollow space to adjust the angle of the blades (preferably automatically).

In another embodiment, the swirler 106 is secured at the second inlet 208 such that a longitudinal axis of the shaft 308 is substantially parallel to the longitudinal axis of the cylindrical vessel (as shown in FIG. 2A). The swirler 106, however, may be secured at the second inlet 208 such that the longitudinal axis of the shaft 308 creates an angle with the longitudinal axis of the cylindrical vessel, with the angle being in the range of 0-45°, preferably 0-30°, to deliver a vortex of the fuel stream towards a top and/or a bottom portion of the cylindrical vessel (i.e. towards a top and/or a bottom portion of a side wall of the cylindrical vessel). Preferably, the swirler 106 (or a plurality of swrilers) may be secured at the second inlet 208 (or a plurality of inlets) with high-temperature duty O-rings and/or gaskets.

In a preferred embodiment, a length of the adjustable blades are at least 10%, preferably at least 20% longer than a length of the shroud 314 such that they stick out past the shroud and inside the combustion zone to direct the fuel stream further away from the center of the combustor (or closer to the ITM). In another embodiment, the length of the adjustable blades changes around the shaft of the swirler (like a spiral staircase).

According to a second aspect the present disclosure relates to a combustion system 100, including the combustor 112 in accordance with the first aspect, an oxygen supplier located upstream of and fluidly connected to the first inlet 212 via a feed line 136 for supplying an oxygen-containing stream 136s, and a fuel supplier 102 located upstream of and fluidly connected to the second inlet 208 via a fuel line 104 for supplying a fuel stream 104s.

The oxygen supplier may be an air cylinder or an oxygen cylinder. Preferably, it may also be a primary compressor 138 located upstream of and fluidly connected to the first inlet 212 via the feed line 136, which delivers an air stream having a temperature in the range of 300-600° C., preferably 300-400° C., and a pressure in the range of 1-50 bars, preferably 1-30 bars, more preferably 1-10 bars. In addition, a heat exchanger and/or a heater may be adapted to recover heat from the oxygen depleted air.

The oxygen-containing stream 136s includes oxygen, and may further include nitrogen and preferably less than 1.0 vol %, more preferably less than 0.5 vol % of argon, carbon dioxide, neon, helium, hydrogen, and water vapor. Preferably, a pressure of the oxygen-containing stream 136s may be within the range of 1-50 bars, preferably 1-30 bars, more preferably 1-10 bars, whereas a temperature of the oxygen-containing stream 136s may be within the range of 600-1, 200° C., preferably 600-800° C., before entering the combustor 112. Preferably, the oxygen-containing stream 136s includes less than 1.0 vol %, preferably less than 0.5 vol %, more preferably less than 0.1 vol %, with volume percent being relative to the total volume of the oxygen-containing stream 136s. Furthermore, an oxygen partial pressure of the oxygen-containing stream 136s may be at least 200 torr, preferably at least 350 torr, more preferably 500 torr, even more preferably at least 600 torr.

The feed line 136 is a tubular channel that is configured to carry the oxygen-containing stream 136s from the oxygen supplier to the first inlet 212 of the combustor 112. In a preferred embodiment, the feed line 136 is made of a metal or an alloy that is coated with a polymer (e.g. epoxy), and is configured to bear a pressure up to 100 bars, preferably up to 200 bars, even more preferably up to 500 bars. In another embodiment, the feed line is made of a polymer (e.g. polyvinylchloride, polyethylene, polypropylene, polytetrafluoroethylene, etc.), and is configured to bear a pressure up to 50 bars, preferably up to 100 bars, even more preferably up to 200 bars.

The fuel supplier 102 may be a methane cylinder or an effluent of a chemical plant that provides a methane stream. Furthermore, the fuel supplier 102 may be a petrochemical plant that provides an ethane stream. However, in a preferred embodiment, the fuel supplier 102 is a gasification plant that provides a syngas stream. Preferably, the fuel supplier 102 is a methane reforming plant that provides a syngas stream. More preferably, the fuel supplier 102 is a solar methane reforming plant that provides a syngas stream. Accordingly, the fuel stream 104s may be a methane stream, an ethane stream, a hydrogen stream, or preferably a syngas stream. Besides, the fuel stream 104s may also be a hydrocarbon stream (in liquid phase and/or in gaseous phase) that can be combusted, e.g. a stream including hydrocarbon compounds (alkanes, alkenes, alkynes, cycloalkanes, etc.) having a carbon content in the range of $C_1$-$C_{20}$, preferably $C_1$-$C_{12}$, more preferably $C_1$-$C_8$. In some preferred embodiments, the fuel stream includes less than 1000 ppm, preferably less than 500 ppm, more preferably less than 100 ppm of nitrogen. Further, the fuel stream includes less than 500 ppm, preferably less than 100 ppm, more preferably less than 50 ppm of sulfur. Having a fuel stream with a reduced sulfur content may be advantageous towards preventing formation of sulfur oxides ($SO_x$) in the combustion zone 108, while a fuel stream with a reduced nitrogen content may be advantageous towards preventing formation of nitrogen oxides ($NO_x$) in the combustion zone 108. Preferably, a pressure of the fuel stream may be within the range of 1-50 bars, preferably 1-30 bars, more preferably 1-10 bars, whereas a temperature of the fuel stream may be within the range of 600-1,200° C., preferably 600-1,000° C.

In some alternative embodiments, the fuel supplier 102 may also refer to a series of operational units that provides a fuel stream 104s having a predetermined pressure, a predetermined temperature, a predetermined flow rate, and a predetermined water content. For example, the fuel supplier may include a dehydrator and/or a dehumidifier, whereby a water content of the fuel stream 104s is reduced to less than 1.0 vol %, preferably less than 0.5 vol %, more preferably less than 0.1 vol %, with volume percent being relative to the total volume of the fuel stream. In addition, the fuel supplier may include a sulfur separator to reduce a sulfur content of the fuel stream to said sulfur content ranges, as described. Preferably, the fuel supplier may also include a separating unit (or a series of separating units) that separates non-oxygen substances such as carbon dioxide, water vapor, and preferably nitrogen from the fuel stream to said sulfur content ranges, as described. A pressure and a flow rate of the fuel stream may be adjusted via an auxiliary compressor in the fuel supplier to be within the range of 1-50 bars, preferably 1-30 bars, more preferably 1-10 bars. In addition, a temperature of the fuel stream 104s may be adjusted by a heater, a cooler, and/or a heat exchanger, which is present in the fuel supplier, to be within the range of 600-1,200° C., preferably 600-1,000° C.

In a preferred embodiment, the fuel stream 104s is a syngas stream having hydrogen and carbon monoxide, and one or more of carbon dioxide, methane, and ethane. The syngas stream may further include traces amount (preferably less than 0.1 vol %) of nitrogen, water vapor, sulfur, hydrogen sulfide, argon, helium, nitrogen oxides (i.e. nitric oxide, nitrous oxide, nitrogen dioxide), or sulfur dioxide.

In a preferred embodiment, the fuel line 104 is made of a metal or an alloy that is coated with a polymer (e.g. epoxy), and is configured to bear a pressure up to 100 bars, preferably up to 200 bars, even more preferably up to 500 bars. In another embodiment, the fuel line is made of a polymer (e.g. polyvinylchloride, polyethylene, polypropylene, polytetrafluoroethylene, etc.), and is configured to bear a pressure up to 50 bars, preferably up to 100 bars, even more preferably up to 200 bars.

In one embodiment, the combustion system 100 further includes an expander 116 located downstream of and fluidly connected to the second outlet 209 via an exhaust line 118 for expanding an exhaust stream 118s to generate power.

In one embodiment, the term "expander" may refer to a centrifugal or an axial flow turbine, wherein a pressurized stream (i.e. the exhaust stream) is expanded in an isentropic process (i.e. a constant entropy process) to produce shaft work when the pressurized stream passes through vanes of said turbine. The shaft work may be utilized to drive a compressor, a generator (for generating electricity), a crankshaft of an engine, etc. In an alternative embodiment, the expander 116 may refer to an internal combustion engine, which is fluidly connected to a combustion chamber, wherein a pressurized stream (i.e. the exhaust stream) is accumulated. Accordingly, the pressurized stream may be utilized to produce shaft work in a two-stroke cycle (i.e. a power generating method with two strokes (up and down movements) of a piston during only one crankshaft revolution).

The exhaust stream 118s includes carbon dioxide and water vapor, and may also include less than 1.0 vol %, preferably less than 0.5 vol % of carbon monoxide, nitrogen oxides (i.e. nitric oxide, nitrous oxide, nitrogen dioxide), sulfur dioxide, argon, helium, and/or carbonic acid. In addition, a temperature of the exhaust stream 118s prior to expanding in the expander 116, is preferably within the range of 800-2,000° C., preferably 800-1,500° C., more preferably 800-1,200° C., whereas the exhaust stream 118s after expanding may have a temperature in the range of 100-1,000° C., preferably 100-500° C., more preferably 150-500° C. The exhaust stream 118s may turn into a double phase stream (i.e. containing both a gaseous phase and a liquid phase), although preferably the exhaust stream 118s is in the gaseous phase.

The exhaust stream 118s may further be utilized to heat up a process stream in the combustion system. Furthermore, the exhaust stream 118s may be utilized to heat up a process stream in a power plant, a chemical processing plant, or a refining plant. Additionally, the exhaust stream 118s may be used for operating pneumatic actuators and/or pneumatic systems in a power plant, a chemical processing plant, or a refining plant.

The exhaust line 118 is made of a high-temperature duty metal or an alloy, and is configured to bear a pressure up to 50 bars, preferably up to 100 bars, even more preferably up to 200 bars, while also configured to endure a temperature up to 1,500° C., preferably 2,000° C., more preferably 2,500° C.

In one embodiment, the combustion system 100 further includes a swirler control unit. The swirler control unit refers to a closed-loop control system, which is adapted to adjust an angle of the blades of the swirler based on the composition of the fuel stream 104s and/or the composition of the exhaust stream 118s. Accordingly, the swirler control unit may include a first gas analyzer 156 disposed on the fuel line 104, which is configured to determine the composition of the fuel stream 104s. The swirler control unit may further include a second gas analyzer 152 disposed on the exhaust line 118 that is configured to determine the composition of the exhaust stream 118s.

In one embodiment, the first and the second gas analyzers are substantially similar; each may be a gas chromatographer (GC) that may be couple to a mass spectrometer (MS). Furthermore, said gas analyzers may be IR-operated analyzers (i.e. IR gas analyzers), although the type of gas analyzers is not meant to be limiting and various other type of gas composition measurement instrument may be used.

The swirler control unit may further include an actuator connected to the blades of the swirler 106. The actuator is configured to adjust an angle of the blades. As described previously, the actuator may preferably be an electric motor or a pneumatic actuator. For example, in some embodiments, the shaft 302 of the swirler 106 has a hollow space, wherein an electric motor, which has a shaft, is located. Further, each blade has a shaft 306, which is perpendicular to the longitudinal axis of the blade. Accordingly, the shaft of the electric motor is coupled to the shaft of each of the blades, preferably via a gear box. Therefore, the electric motor is adapted to determine the angle of the blades of the swirler 106. Alternatively, in a preferred embodiment, the actuator is pneumatically operated. The actuator may also be hydraulically operated.

The swirler control unit may further include a processor 150 that is configured to receive a first signal 158 from the first gas analyzer 156 and a second signal 154 from the second gas analyzer 152, and to transmit a first output signal 159 to the actuator. The processor 150 may refer to a programmable hardware device that is adapted to calculate a predetermined angle (as the first output signal 159) based upon the first and the second signals that contain the composition of the fuel and the exhaust streams, respectively. The first and the second signals may further include the temperature, the pressure, and the flow rate of the fuel and the exhaust streams.

In a preferred embodiment, the predetermined angle is adjustable within the range of 0 to 85°, preferably 0 to 75°, more preferably 30 to 60°, and is instantaneously adjusted based on variations in the composition of the fuel and the exhaust streams during operating the combustor 112. In one embodiment, the fuel stream is a syngas stream, which is produced via a solar methane reforming process, and the predetermined angle is calculated based on the following formula:

$$SA = a*F + b*C + c*H + d$$

wherein SA is the predetermined angle, F is a combustion firing rate (i.e. the energy release rate in the combustor 112), C is a percentage of carbon dioxide in the fuel stream, and H is the percentage of hydrogen in the fuel stream. In addition, each of a, b, c, and d is numerical values in the range of −1000 to 1000, preferably −500 to 500.

In one embodiment, the predetermined angle of the adjustable blades is set relative to a carbon dioxide content (i.e. a partial pressure of carbon dioxide) of the fuel stream (or the combustion mixture). For example, if the carbon dioxide content is above 30 vol %, preferably above 50 vol %, the predetermined angle is wider, and vice versa. However, in a preferred embodiment, the predetermined angle of the adjustable blades is set based on an amount of hydrocarbon compounds present in the fuel stream and/or an amount of carbon dioxide in the exhaust stream.

In one embodiment, the combustion system 100 further includes a flow control unit, which is a closed-loop control system adapted to control the volumetric flow rate of the oxygen-containing stream 136s based on the composition and the volumetric flow rate of the fuel stream 104s.

In a preferred embodiment, the flow control unit includes the first gas analyzer 156 of the swirler control unit, which is utilized to determine the composition of the fuel stream 104s, and to generate a third signal, which is substantially similar to the first signal 158. In another embodiment, the flow control unit includes a third gas analyzer, which is substantially similar to the first gas analyzer 156, disposed on the fuel line 104 configured to determine the composition of the fuel stream 104s.

The flow control unit may further include a flowmeter 144 disposed on the fuel line 104 configured to determine the volumetric flow rate of the fuel stream 104s, and to generate a flow rate signal 162.

The flow control unit may further include a first control valve 140 disposed on the feed line 136 configured to control a volumetric flow rate of the oxygen-containing stream 136s. The first control valve 140 may be a check valve, a ball valve, a gate valve, or a diaphragm valves, although the valve type is not meant to be limiting and various other type of valves may also be used.

The flow control unit may further include a flow controller 160 that is configured to receive the third signal from the first gas analyzer 156 (or the third gas analyzer) and the flow rate signal 162 from the flowmeter 144, and to generate and transmit a second output signal 164 to the first control valve 140. The flow controller 160 may refer to a programmable hardware device that is adapted to measure a predetermined volumetric flow rate (as the second output signal 164) based upon the flow rate signal 162 and the third signal.

In one embodiment, the flow control unit adjusts the volumetric flow rate of the oxygen-containing stream 136s to be within the range of 1-5,000 L/min, preferably 100-3,000 L/min, more preferably 500-2,000 L/min per 1.0 m$^2$ surface area of the ion transport membrane 210.

In an alternative embodiment, the flow control unit adjusts a volumetric flow rate ratio of the fuel stream 104s to the oxygen-containing stream 136s to be within the range of 0.9-1.1, preferably about 1. For example, in circumstances where the volumetric flow rate of the fuel stream 104s reduces, the volumetric flow rate of the oxygen-containing stream 136s also reduces to maintain the volumetric flow ratio to be within the range of 0.9-1.1, preferably about 1. Likewise, in some other circumstances where the composition of the fuel stream 104s changes, the volumetric flow rate of the oxygen-containing stream 136s is also changed to maintain the volumetric flow ratio to be within the range of 0.9-1.1, preferably about 1.

In some embodiments, the combustion system 100 further includes a recycle line 126 that fluidly connects the exhaust line 118 to the fuel line 104. Preferably, the recycle line 126 is substantially similar to the exhaust line 118. Accordingly, the combustion system further includes a temperature control unit, which is a closed-loop control system adapted to control the temperature of the fuel stream 104s based on the temperature of the exhaust stream 118s.

The temperature control unit may include a temperature sensor 172 disposed on the exhaust line 118 that is configured to determine a temperature of the exhaust stream 118s, and to generate a temperature signal 174. The temperature sensor 172 may preferably be a thermocouple, although the sensor type is not meant to be limiting and various other type of temperature sensors may also be used. Further, the temperature control unit may include a second control valve 128, which may be substantially similar to the first control valve 140, disposed on the recycle line 126 configured to control the volumetric flow rate of the exhaust stream 118s.

Furthermore, the temperature control unit may include a temperature controller 170 that is configured to receive the temperature signal 174, and to transmit a third output signal 176 to the second control valve 128. The temperature controller 170 may refer to a programmable hardware device that is adapted to measure a predetermined temperature (as the third output signal 176) based upon the temperature signal 174.

Since the temperature control unit utilizes a thermal energy of the exhaust stream 118s to control the temperature of the fuel stream 104s, a heat exchanger and/or a heater may be disposed on the recycle line 126 to raise the temperature of the exhaust stream 118s, in cases where the temperature of the exhaust stream 118s is lower than 500° C., preferably lower than 800° C.

In one embodiment, the combustion system 100 further includes a mixer 134 located upstream of the combustor 112 and is fluidly connected to the fuel line 104 and the recycle line 126. In a preferred embodiment, the mixer 134 is configured to mix the fuel stream 104s with the exhaust stream 118s.

The mixer 134 may refer to an operational unit adapted to mix a plurality of gas streams, preferably at low-to-medium pressures (i.e. up to 50 bars, preferably up to 20 bars), and deliver a combustion mixture having a predetermined pressure (e.g. within the range of 1-50 bars, preferably 1-30 bars, more preferably 1-10 bars), and a predetermined temperature (e.g. within the range of 200-500° C., preferably 200-400° C.).

In a preferred embodiment, the combustion system 100 further includes an oxygen-depleted line 142 that is fluidly connected to the first outlet 214, and a primary heat exchanger 132 disposed on the recycle line 126 and upstream of the mixer 134, while the primary heat exchanger 132 is located on the oxygen-depleted line 142 and downstream of the first outlet 214. Accordingly, the primary heat exchanger 132 is configured to heat exchange the exhaust stream 118s with an oxygen-depleted stream 142s that egresses the first outlet 214 to raise the temperature of the exhaust stream 118s, in cases where the temperature of the exhaust stream 118s is lower than 500° C., preferably lower than 800° C.

In another embodiment, the combustion system 100 further includes a secondary heat exchanger 133 disposed on the feed line 136 and upstream of the first inlet 212, while the secondary heat exchanger 133 is located on the oxygen-depleted line 142 and downstream of the first outlet 214. Accordingly, the secondary heat exchanger 133 is configured to heat exchange the oxygen-containing stream 136s with an oxygen-depleted stream 142s that egresses the first outlet 214. The primary and the secondary heat exchangers may preferably be shell and tube heat exchangers, although the heat exchanger type is not meant to be limiting and various other heat exchangers may also be used.

In an alternative embodiment, the oxygen-depleted line 142 is fluidly connected to a gas turbine, wherein the oxygen-depleted stream 142s passes through vanes of the gas turbine to generate shaft work.

In a preferred embodiment, the combustion system 100 further includes a condenser 120 located downstream of and fluidly connected to the expander 116 via the exhaust line 118. Preferably, the condenser 120 is configured to separate a liquid phase from the exhaust stream 118s. The condenser 120 may be a heat exchanger, a cooling system, or a refrigeration system, although the condenser type is not meant to be limiting and various other condensers may also be used.

In one embodiment, the combustor 112 of the combustion system 100 includes the sweep zone 109 which is sandwiched between the feed zone 110 and the combustion zone 108, and the recycle line 126 fluidly connects the exhaust line 118 to the third inlet 222. Accordingly, the exhaust stream 118s flows into the sweep zone 109, which may sweep the molecular oxygen 114 away from the sweep zone 109 and further egresses the third outlet 224. The exhaust stream 118s that now includes the molecular oxygen 114 enters the mixer 134 and is mixed with the fuel stream 104s to form the combustion mixture, which is further fed into the combustion zone 108.

According to a third aspect the present disclosure relates to a process for combusting the fuel stream 104s (as described previously), involving delivering the oxygen-containing stream 136s (as described previously) to the first inlet 212 of a combustor 112 having a feed zone 110 and a combustion zone. Accordingly, molecular oxygen 114 present in the oxygen-containing stream 136s is transported to the combustion zone through the ion transport membrane 210. The oxygen-containing stream 136s may be delivered via the primary compressor 138, which is located upstream of the first inlet 212.

The process further involves delivering the fuel stream 104s to the second inlet 208 of the combustor 112. According to the present disclosure, in order to enhance mixing the fuel stream 104s with the molecular oxygen 114 and to increase a residence time of the fuel stream 104s and the molecular oxygen 114 in the combustion zone, the fuel stream 104s is expanded and/or agitated via the swirler 106, which is disposed at the second inlet 208. Further, the fuel stream 104s is combusted in the presence of the molecular oxygen 114 via an oxy-combustion, and forms the exhaust stream 118s. As discussed, the exhaust stream 118s includes water vapor and carbon dioxide, and may also include less than 1.0 vol %, preferably less than 0.5 vol % of carbon monoxide, nitrogen oxides (i.e. nitric oxide, nitrous oxide, nitrogen dioxide), sulfur dioxide, argon, helium, and/or carbonic acid. The exhaust stream 118s, which egresses the second outlet 209, may further be expanded in the expander 116 (as described previously) to generate power.

In a preferred embodiment, the process further involves mixing a portion of the exhaust stream 118s with the fuel stream 104s via the mixer 134 prior to delivering the fuel stream 104s to the second inlet 208 of the combustor 112. Although, the exhaust stream 118s to be mixed with the fuel stream 104s includes water vapor, the process may preferably involve cooling the exhaust stream 118s to form a water stream 124s and a carbon dioxide stream 122s, and further mixing the carbon dioxide stream 122s with the fuel stream 104s. Furthermore, the process may involve heat exchanging the carbon dioxide stream 122s with the oxygen-depleted stream 142s, which egresses the first outlet 214 of the combustor 112, to adjust the temperature of the exhaust stream 118s prior to mixing the same with the fuel stream 104s.

In another preferred embodiment, the process further involves heat exchanging the oxygen-containing stream 136s with the oxygen-depleted stream 142s, prior to delivering the oxygen-containing stream 136s to the first inlet 212 of the combustor 112. Heat exchanging the oxygen-containing stream 136s with the oxygen-depleted stream 142s may eliminate the need for an additional process step to adjust the temperature of the oxygen-containing stream 136s prior to delivering the same to the combustor 112.

The process further involves adjusting an angle of each blade of the swirler 106 based on the composition of the fuel stream 104s and/or the composition of the exhaust stream 118s via the swirler control unit. Preferably, the angle of each blade is adjusted instantaneously based on the variations in the composition of the fuel stream 104s and/or the composition of the exhaust stream 118s.

In one embodiment, the process further involves controlling the volumetric flow rate of the oxygen-containing stream 136s based on the composition and the volumetric flow rate of the fuel stream 104s via the flow control unit.

In one embodiment, the process further involves controlling the temperature of the fuel stream 104s based on the temperature of the exhaust stream 118s via the temperature control unit.

In one embodiment, the process further involves cooling the exhaust stream 118s via the condenser 120 to form a liquid phase including water and a gaseous phase including carbon dioxide. The exhaust stream 118s may be cooled to room temperature (i.e. 25° C.), preferably a temperature below room temperature and above water freezing point (e.g. 15° C.), at atmospheric pressure. Other than water, the liquid phase may also include less than 1.0 vol %, preferably less than 0.5 vol % carbonic acid. The gaseous phase, however, includes carbon dioxide and no more than 0.5 vol %, preferably no more than 0.1 vol % of nitrogen, hydrogen, carbon monoxide, argon, helium, methane, and/or ethane.

In one embodiment, the method of combusting the fuel stream 104s further involves separating the liquid phase from the gaseous phase, for example via a vapor-liquid separator. In a preferred embodiment, the gaseous phase is nearly a pure carbon dioxide having at least 99 vol %, preferably at least 99.5 vol %, more preferably at least 99.9 vol % carbon dioxide, and thus the method further involves injecting the gaseous phase into a geological formation. The gaseous phase may also be used in supercritical extraction systems or in processes where a low/medium/high pressure carbon dioxide stream is needed.

According to a fourth aspect the present disclosure relates to a process for combusting the fuel stream, involving combusting the fuel stream with molecular oxygen 114 in the combustion zone of a combustor having a feed zone, a combustion zone, and a sweep zone.

The process in accordance with the fourth aspect further involves delivering the oxygen-containing stream 136s to the first inlet 212 of the combustor, wherein molecular oxygen 114 present in the oxygen-containing stream 136s is transported to the sweep zone 109 through the ion transport membrane 210.

The process further involves flowing a portion of the exhaust stream 118s, which may initially be formed by combusting the fuel stream in the presence of molecular oxygen 114 in the combustion zone, into the third inlet 222 of the combustor to sweep the molecular oxygen 114 away from the sweep zone 109 and to form an oxygen-enriched stream. The exhaust stream 118s may be flowed into the sweep zone 109 via a secondary compressor 130, which is located upstream of the third inlet 222 and fluidly connected to the recycle line 126. In one embodiment, the oxygen-enriched stream includes oxygen, carbon dioxide, and water vapor, and may also include less than 1.0 vol %, preferably less than 0.5 vol % of carbon monoxide, nitrogen, hydrogen, argon, and helium. Preferably, the exhaust stream 118s is first separated to the water stream 124s and the carbon dioxide stream 122s, and the carbon dioxide stream flows into the sweep zone 109. Accordingly, the oxygen-enriched stream includes oxygen and carbon dioxide, and may also include less than 2.0 vol %, preferably less than 1.0 vol % of water vapor, carbon monoxide, nitrogen, hydrogen, argon, and helium.

The process further involves mixing the oxygen-enriched stream with the fuel stream in the mixer 134 (as described previously) to form a combustion mixture that includes methane, ethane, hydrogen, carbon monoxide, water vapor, carbon dioxide, and/or hydrocarbon compounds such as alkanes, alkenes, alkynes, cycloalkanes, etc. preferably having a carbon content in the range of $C_1$-$C_{20}$, preferably $C_1$-$C_{12}$, more preferably $C_1$-$C_8$. Preferably, a volume fraction of water vapor in the combustion mixture is less than 0.005, more preferably less than 0.001.

The process further involves delivering the combustion mixture to the second inlet 208 of the combustor, wherein the combustion mixture is whirled (i.e. expanded and/or agitated) in the combustion zone via the swirler and is combusted to form the exhaust stream 118s.

The process further involves repeating flowing the exhaust stream 118s into the third inlet 222 of the combustor, mixing the oxygen-enriched stream with the fuel stream in the mixer 134, and delivering the combustion mixture to the second inlet 208 of the combustor to combust.

In a preferred embodiment, the process further involves adjusting an angle of each blade of the swirler based on the composition of the combustion mixture. Preferably, the angle of each blade is adjusted instantaneously based on the variations in the composition of the combustion mixture.

The examples below are intended to further illustrate protocols for the combustor, the combustion system, and the process for combusting the fuel stream with the combustion system, and are not intended to limit the scope of the claims.

Example 1

The below examples relate to an ion transport membrane (ITM) integrated to a fuel flexible combustor in a gas turbine system, which referred to as an ITM integrated combustor. Further, a feedback control system is adapted to ensure efficient combustion under a syngas stream, which is produced via a solar reforming process, having a variable composition.

The examples further relate to an ITM integrated system that includes a hydrocarbon solar reforming system or other sources of producing a syngas stream, the ITM integrated combustor, wherein the syngas stream takes place either in premixed or non-premixed condition, a variable swirler and a control assembly to change the angle of the vanes of the swirler, wherein the vane angle changes between zero and 75°, depending on the prevailing conditions including the fuel composition, exhaust gas temperature and composition of the exhaust, an second feedback control system that includes various gas composition sensors, gas flow meter sensors and gas state sensors that individually or collectively communicate to the swirler control unit, recycled gas control unit and air flow control unit, and other auxiliary accessories that ensure proper flow communication in the system.

Example 2

A reformed syngas fuel was delivered to the ITM integrated combustor. The gas detector and the gas flowmeter 144 provided a feedback signal, which contain information about the composition and volume of syngas fuel being delivered to the swirler, to the air control unit. Next, the air control unit determined the appropriate quantity of air to be supplied and communicated same to the air mass controller.

On the other hand, the gas detector disposed at the exterior of the combustor communicated the composition of the combustion product to the swirler control unit. Then, the swirler control unit determined the appropriate blade angle for that particular fuel composition. Having the adjustable swirler at the inlet of the ITM combustor is advantageous because, it enhance the permeation of the oxygen due to a quick pick up of oxygen by the swirling flow adjacent to the ITM. Further, it improves the mixing of the fuel (i.e. the syngas stream) and molecular oxygen for more efficient combustion in the ITM combustor. Additionally, the swirler increases the residence time of the reactants for complete combustion of the fuel.

A plurality of sensors, which are installed at the exit of the combustor, further communicated the temperature and the pressure of the exhaust, which is $CO_2/H_2O$ or preferably $CO_2$, to a recycle gas control unit to adjust the flow rate of the recycle stream as well as the temperature of the influent of the combustor to prevent damage to the combustor and the turbine. These sensor signals also communicated with the swirler control unit. The feedback from the control units was used to simultaneously control the air flow rates, the swirler blade angles and the amount of exhaust gas recycled to achieve a stable combustion and gas emission free combustion products.

The ITM combustor further included a sweep zone, which was separated from the combustion zone of the combustor, and molecular oxygen was permeated into the sweep zone via the ITM. The temperature of the permeated oxygen was raised because it was in direct contact with the wall of the combustion zone, while the sweep zone protects the ITM from thermal shock and failure. The oxygen-depleted air at high temperature was also used to preheat the compressed air leading to partial heat recovery.

In some circumstances where water droplets were observed in the exhaust stream, the exhaust stream was first cooled and a liquid phase was separated, and the gaseous phase, which only includes $CO_2$ was recycled.

Example 3

Figure 3C:
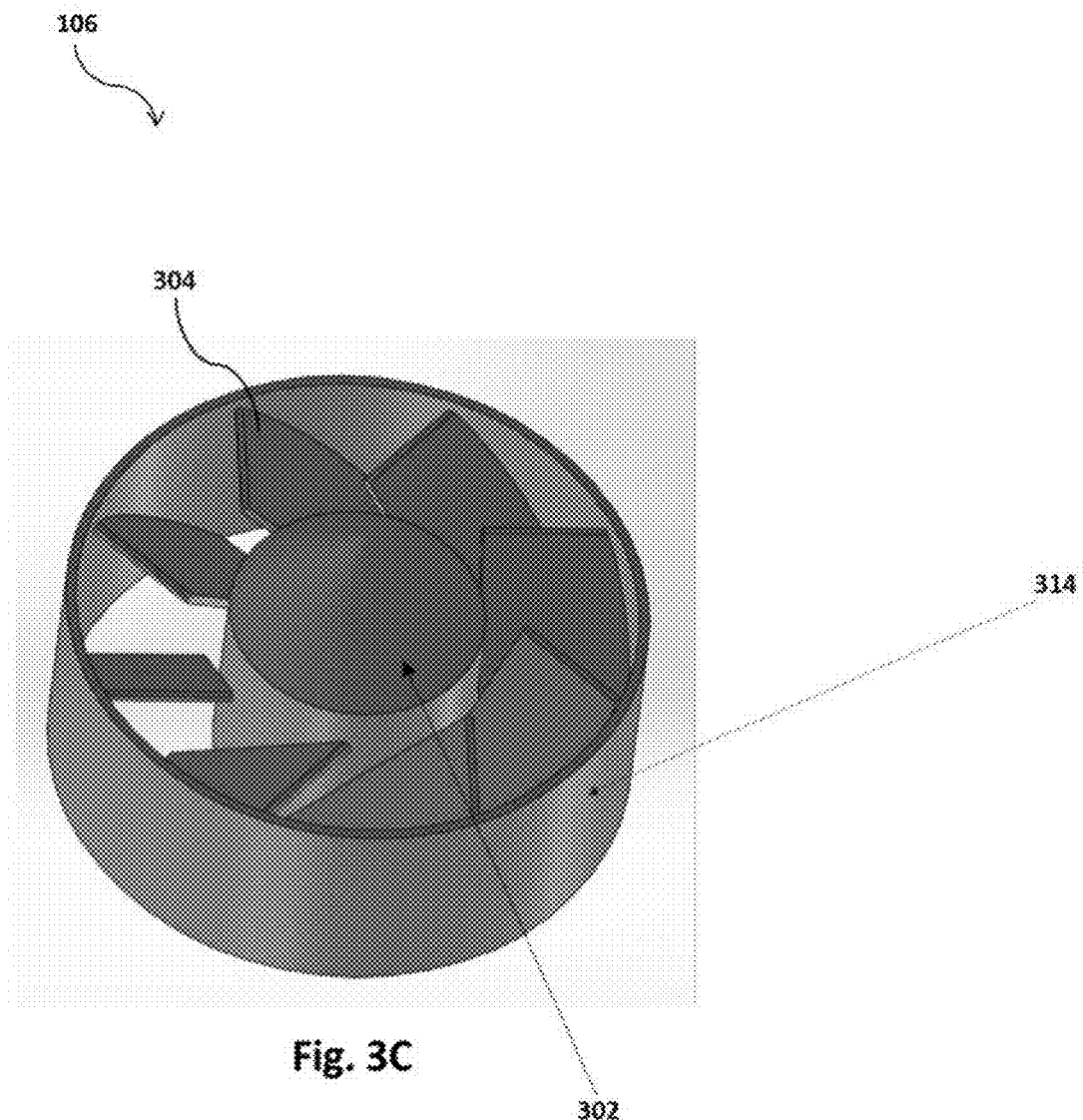
FIG. 3C illustrates an adjustable swirler having a shroud.

The adjustable swirler, which has been used in the combustor, is shown in FIGS. 3A, 3B, and 3C. It consists of a shaft, a plurality of blades, and an outer casing (i.e. a shroud). The actuator, which rotates the blades, was secured inside the shaft.

To achieve a preferable control over the swirler control unit, a dataset containing a preferred swirl angle at each operating condition has been stored in the memory (CPU) of the control system. This dataset had been obtained via a series of trial and error experiments to obtain the preferred swirl angle that provides the most stabilized combustion at various fuel compositions. The details of the experimental analysis are given in the below examples.

Example 4

We designed and carried out a series of experiments as a case study to generate sample data for a preferred condition of an ITM-swirler combustor. Three swirler angles 30°, 45°, and 55° with swirl numbers of approximately 0.38, 1.67, and 0.95, respectively were tested. Methane ($CH_4$) and methane ($CH_4$)/hydrogen ($H_2$) fuel mixtures were used as characteristic syngas fuels. Experiments were conducted by varying the carbon dioxide ($CO_2$) in the oxygen ($O_2$)/carbon dioxide ($CO_2$) oxidizer mixture to determine the combustor stability of $CH_4$ and $CH_4/H_2$ fuels when the swirler at different angles were used. $CO_2$ was added to moderate the temperature of the flame to an acceptable limit to prevent damage to the combustor and to the gas turbine blades, while also serving as an energy carrier. The amount of $CO_2$ that extinguished the flame was used as the surrogate to describe the combustor stability. Therefore, the combustion operating conditions (i.e. at a specified fuel stream and a specified swirler angle, etc.) that could withstand a higher amount of $CO_2$ before being extinguished were assumed more stable.

Example 5

Figure 4A:
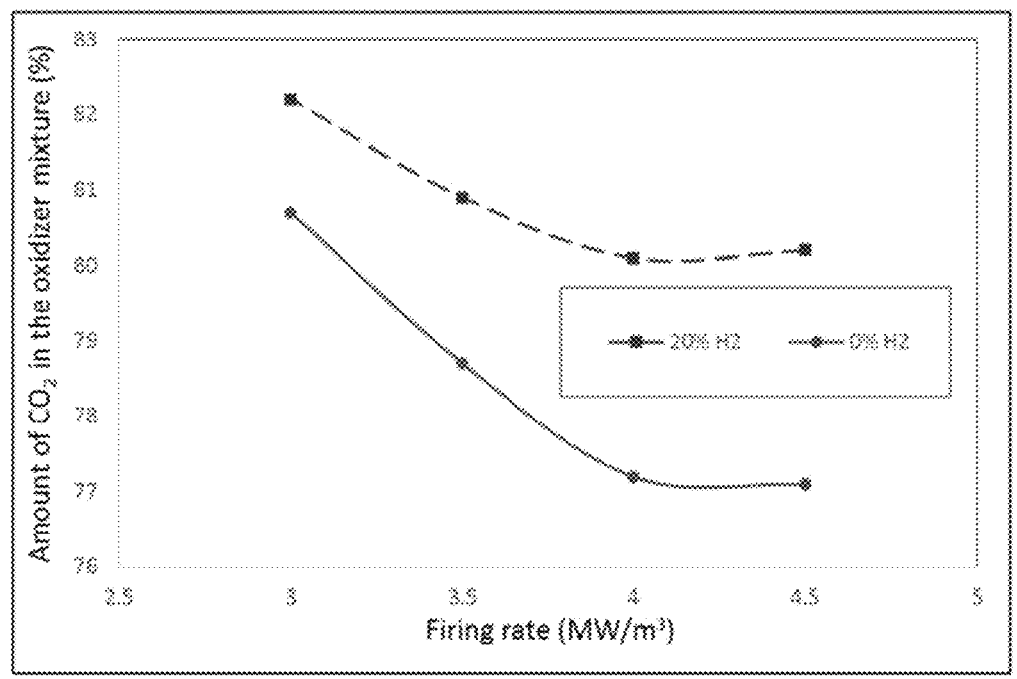
FIG. 4A represents a stability limit of a flame for two combustion mixtures, i.e. $CH_4$ only, and $CH_4/H_2$, at a swirl angle of 30°.
Figure 4B:
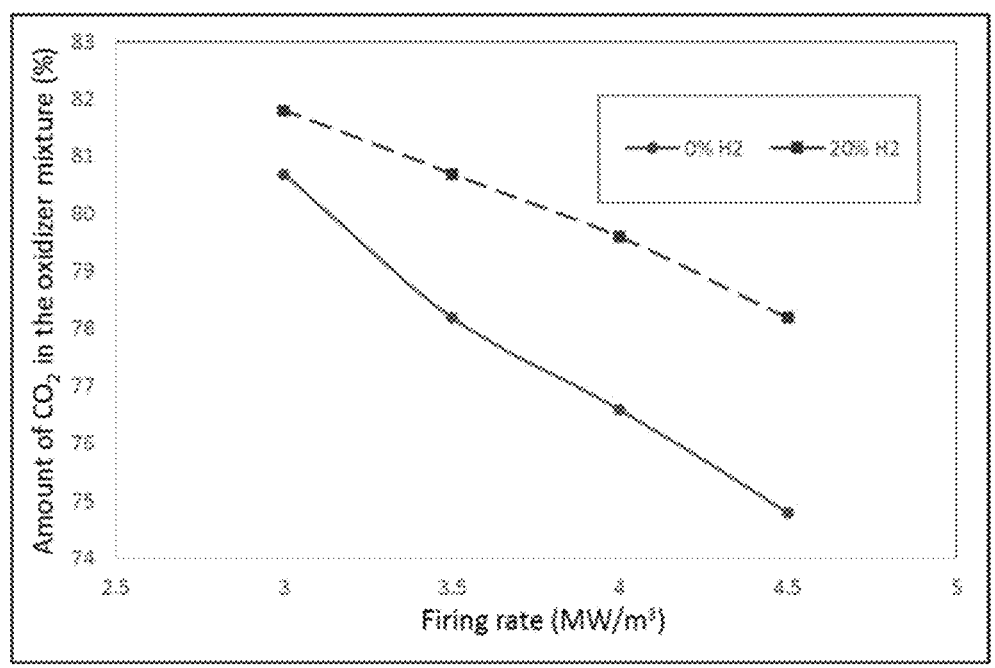
FIG. 4B represents a stability limit of a flame for two combustion mixtures, i.e. $CH_4$ only, and $CH_4/H_2$, at a swirl angle of 45°.
Figure 4C:
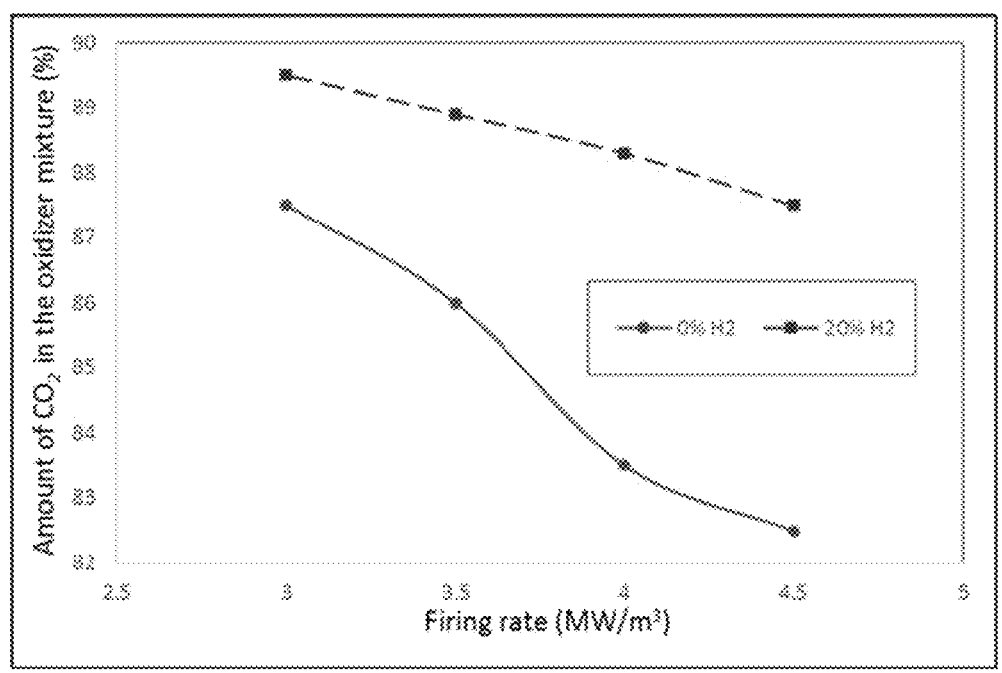
FIG. 4C represents a stability limit of a flame for two combustion mixtures, i.e. $CH_4$ only, and $CH_4/H_2$, at a swirl angle of 55°.

Data of the stability limit at different operating conditions are summarized in Table 1. In addition, FIGS. 4A, 4B, and 4C show the stability limit of a $CH_4$ and a $CH_4/H_2$ fuel at different swirl angles. According to this figure, the firing rate (combustor load) significantly affected the stability of the combustor due to the combined effect of the amount of the heat released in the combustor, the combustion product residence time, and the effective mixing of air with oxidizer. Results further show that the addition of hydrogen extends the stability of methane flame due to hydrogen higher extinction strain rate resistance as compared to the case of pure methane. This implies that by outright change of fuel or fuel compositions, the stability of the combustion are highly affected. For instance, by increasing the $H_2$ composition from 0% to 20% in $CH_4/H_2$ flame, the flame was able to withstand an addition of about 3%, 3% and 5% of $CO_2$ for a swirler blade angle of 30, 45, and 55 degrees, respectively before the flame extinguishes.

TABLE 1

Blow off point at different operating conditions.

| Swirler | Hydrogen Concentration (%) | Firing rate (MW/m3) | Blow off (percentage of $CO_2$ in $O_2/CO_2$ oxidizer) |
|---|---|---|---|
| 30 | 0 | 4.5 | 77.1 |
|  |  | 4 | 77.2 |
|  |  | 3.5 | 78.7 |
|  |  | 3 | 80.7 |
|  | 20 | 4.5 | 80.2 |
|  |  | 4 | 80.1 |
|  |  | 3.5 | 80.9 |
|  |  | 3 | 82.2 |

TABLE 1-continued

Blow off point at different operating conditions.

| Swirler | Hydrogen Concentration (%) | Firing rate (MW/m3) | Blow off (percentage of $CO_2$ in $O_2/CO_2$ oxidizer) |
|---|---|---|---|
| 45 | 0 | 4.5 | 74.8 |
|  |  | 4 | 76.6 |
|  |  | 3.5 | 78.2 |
|  |  | 3 | 80.7 |
|  | 20 | 4.5 | 78.2 |
|  |  | 4 | 79.6 |
|  |  | 3.5 | 80.7 |
|  |  | 3 | 81.8 |
| 55 | 0 | 4.5 | 82.5 |
|  |  | 4 | 83.5 |
|  |  | 3.5 | 86 |
|  |  | 3 | 87.5 |
|  | 20 | 4.5 | 87.5 |
|  |  | 4 | 88.3 |
|  |  | 3.5 | 88.9 |
|  |  | 3 | 89.5 |

Example 6

Figure 5A:
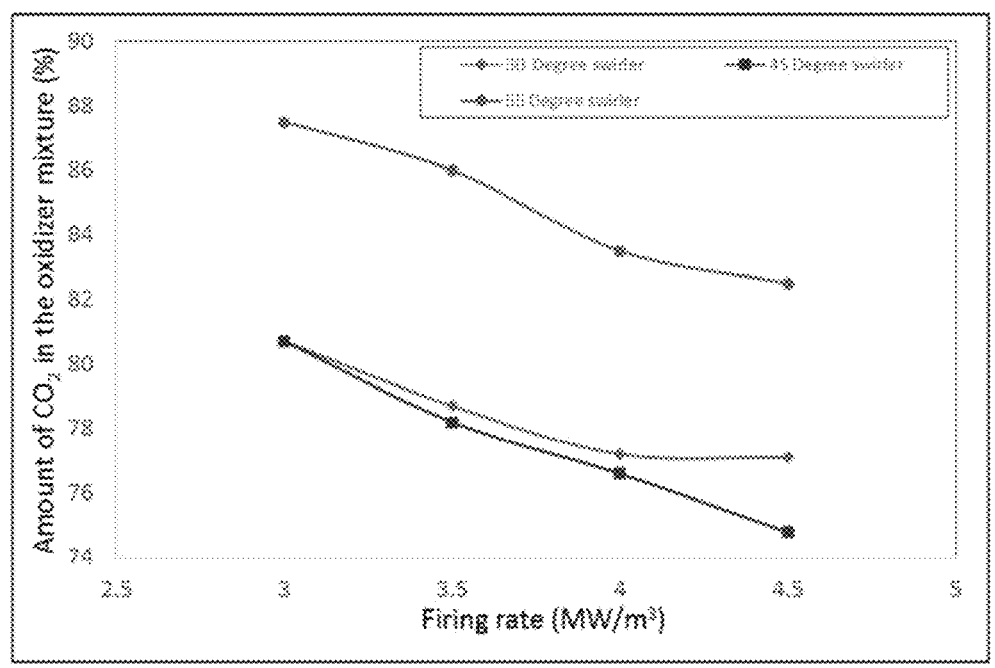
FIG. 5A represents the stability limit of a flame for a combustion mixture having $CH_4$ only, at various swirl angles.
Figure 5B:
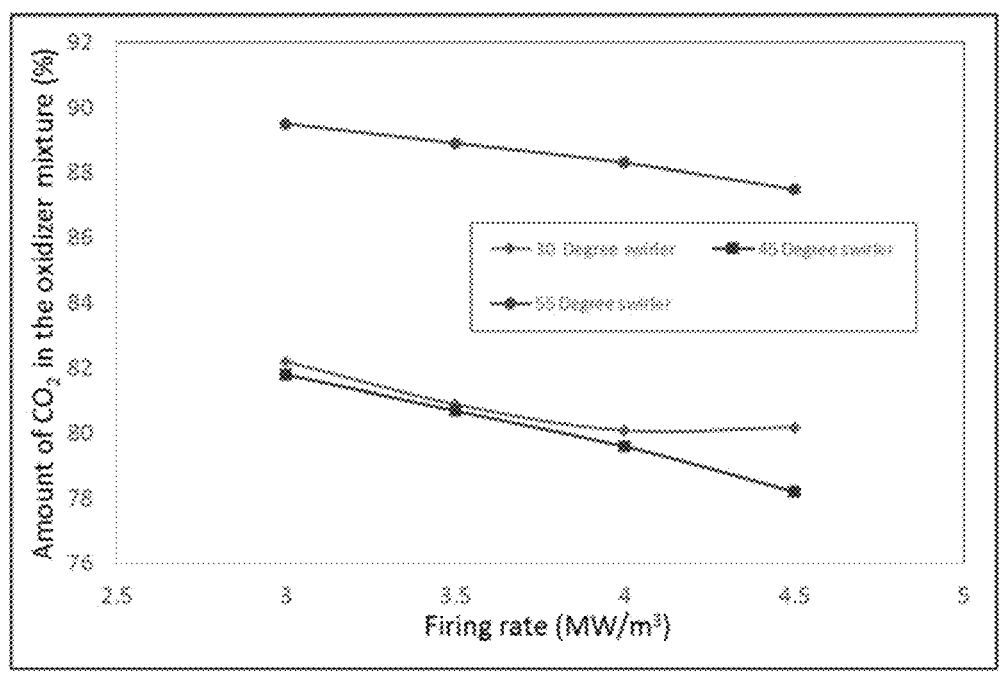
FIG. 5B represents the stability limit of a flame for a combustion mixture having $CH_4/H_2$, at various swirl angles.

Another point of interest is how the swirler impacts the flame stability. The presence of the swirler was shown to enhance the fuel-oxidizer mixing for an efficient combustion. The results show that in a non-swirling flow, long jet like flame with narrow stability range was observed. The flame, however, becomes compact with a v-shape configuration under swirling flow conditions. In FIGS. 5A and 5B, the dependency of the flame stability on the swirl number for both fuel streams $CH_4$ and $CH_4/H_2$ are shown. There is a marginal difference on the effect of increasing swirl angle from 30° to 45°, for both fuel streams $CH_4$ and $CH_4/H_2$. However, an increase in the swirl number from 45° to 55° resulted in an increase in the amount $CO_2$. The flame could withstand before the flame extinguishes by about 8% for 0% $H_2$ and 10% for 20% $H_2$.

Example 7

The multi-component factors of oxidizer mixture, fuel type and mixtures, firing rate and swirl number was shown to have varying effects on the emissions, flame stability and temperature distribution within the combustor. Accordingly, we obtained a multi-regression equation that predict the minimum swirl angle for a stable combustion in term of the firing rate, percentage of $CO_2$ in the oxidizer mixture and the $H_2$ in the $CH_4/H_2$ mixture as given in Eq. (1):

$$SW = 7.3594F + 3.4071C - 0.5196H - 263.29 \quad (1)$$

where SW is the minimum swirl angle to ensure continuous stable operation of the combustor, F is the combustion firing rate in $MW/m^3$ of the combustor volume, C is the $CO_2$ percentage in the $O_2/CO_2$ oxidizer mixture, and H is the $H_2$ percentage in the $CH_4/H_2$ fuel mixture.

Example 8

Figure 6:
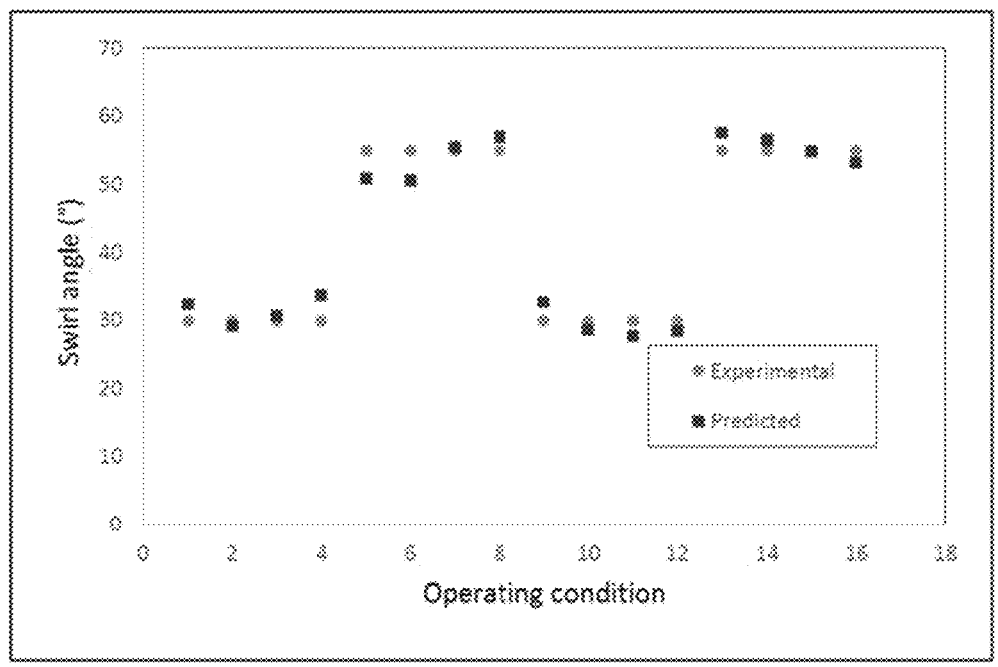
FIG. 6 represents an experimental and a predicted minimum swirl angle of the adjustable swirler under various operating conditions.

Different operating conditions were combined to obtain stability limits for combustion with the swirler blade angles in the range of 30° to 55°. These operating conditions were substituted in the obtained equation (Eq. (1)). The experimental results and those obtained using Eq. 1 are presented in Table 2, and also illustrated in FIG. 6. It is important to note that each data point only shows the minimum swirl angle at which a combination of factors (fuel composition, oxidizer composition, firing rate) could achieve the flame stability. A good prediction of the minimum swirl angle for a stable combustion was observed (as shown in FIG. 6).

TABLE 2

Comparison of the experimental and predicted minimum swirl angle for combustor stability.

| | Operating conditions | | | | | |
|---|---|---|---|---|---|---|
| Data set | Firing rate (MW/m3) | Hydrogen Concentration (%) | Blow off (percentage of $CO_2$ in $O_2/CO_2$ oxidizer) | Minimum swirl angle | | Prediction error (%) |
| | | | | Experimental | Numerical | |
| 1 | 4.5 | 0 | 77.1 | 30 | 32.51703 | 8.39 |
| 2 | 4 | 0 | 77.2 | 30 | 29.17804 | 2.74 |
| 3 | 3.5 | 0 | 78.7 | 30 | 30.60905 | 2.03 |
| 4 | 3 | 0 | 80.7 | 30 | 33.74364 | 12.48 |
| 5 | 4.5 | 0 | 82.5 | 55 | 50.9156 | 7.43 |
| 6 | 4 | 0 | 83.5 | 55 | 50.64304 | 7.92 |
| 7 | 3.5 | 0 | 86 | 55 | 55.4812 | 0.87 |
| 8 | 3 | 0 | 87.5 | 55 | 56.91221 | 3.48 |
| 9 | 4.5 | 20 | 80.2 | 30 | 32.68737 | 8.96 |
| 10 | 4 | 20 | 80.1 | 30 | 28.66695 | 4.44 |
| 11 | 3.5 | 20 | 80.9 | 30 | 27.71297 | 7.62 |
| 12 | 3 | 20 | 82.2 | 30 | 28.46255 | 5.12 |
| 13 | 4.5 | 20 | 87.5 | 55 | 57.55951 | 4.65 |
| 14 | 4 | 20 | 88.3 | 55 | 56.60553 | 2.92 |
| 15 | 3.5 | 20 | 88.9 | 55 | 54.97011 | 0.05 |
| 16 | 3 | 20 | 89.5 | 55 | 53.3347 | 3.03 |

Example 9

In industrial settings, where in-situ control is demanded, an electronic control unit (ECU) can be preloaded with a large amount of data or the ECU can be connected to a data banks. In such cases, the combustor load requirement (firing rate), the amount of $CO_2$ needed (to achieve the preferable turbulence and temperature limit of the combustor), the type of fuel supplied, and other constrains can be mapped against the minimum swirl angle in the data bank, preloaded data, and/or an equation programmed within the ECU. The ECU will communicate same to the swirler controller to maintain a continuous stable operation for the combustor.

The invention claimed is:

1. A combustion system, comprising:
   a combustor comprising:
      a cylindrical vessel with an internal cavity,
      an ion transport membrane that divides the internal cavity of said cylindrical vessel into a first and a second concentric cylindrical zone, wherein the first concentric cylindrical zone is a feed zone and the second concentric cylindrical zone is a combustion one,
      a first inlet and a first outlet located in the feed zone, and a second inlet and a second outlet located in the combustion zone, and
      a swirler that is connected to the second inlet, wherein the swirler has adjustable blades with adjustable angles:
   an oxygen supplier located upstream of and fluidly connected to the first inlet via a feed line for supplying an oxygen-containing stream;
   a fuel supplier located upstream of and fluidly connected to the second inlet via a fuel line for supplying a fuel stream;
   an expander located downstream of and fluidly connected to the second outlet via an exhaust line for expanding an exhaust stream to generate power;
   a recycle line that fluidly connects the exhaust line to the fuel line;
   a mixer located upstream of the combustor and fluidly connected to the fuel line and the recycle line configured to mix the fuel stream with the exhaust stream;
   an oxygen-depleted line fluidly connected to the first outlet; and
   a primary heat exchanger disposed on the recycle line and fluidly connected to the oxygen-depleted line, wherein the primary beat exchanger is located downstream of the first outlet and upstream of the mixer, and is configured to heat exchange the exhaust stream with an oxygen-depleted stream that egresses the first outlet to raise a temperature of the exhaust stream.

2. The combustion system of claim 1, further comprising:
   a swirler control unit comprising
      a first gas analyzer disposed on the fuel line configured to determine a composition of the fuel stream,
      a second gas analyzer disposed on the exhaust line configured to determine a composition of the exhaust stream,
      an actuator connected to the adjustable blades of the swirler configured to adjust an angle of the adjustable blades, and
      a processor that is configured to receive a first signal from the first gas analyzer and a second signal from the second gas analyzer, and to transmit a first output signal to the actuator,
   wherein the swirler control unit is configured to adjust an angle of the adjustable blades based on the composition of the fuel stream and the exhaust stream.

3. The combustion system of claim 2, further comprising:
   a flow control unit comprising:
      the first gas analyzer disposed on the fuel line configured to determine the composition of the fuel stream,
      a flowmeter disposed on the fuel line configured to determine a volumetric flow rate of the fuel stream,
      a first control valve disposed on the feed line configured to control a volumetric flow rate of the oxygen-containing stream,
      a flow controller that is configured to receive the first signal from the first gas analyzer and a flow rate signal from the flowmeter, and to transmit a second output signal to the first control valve,
   wherein the flow control unit is configured to control the volumetric flow rate of the oxygen-containing stream based on the composition and volumetric flow rate of the fuel stream.

4. The combustion system of claim 3, further comprising:
   a temperature control unit comprising:
      a temperature sensor disposed on the exhaust line configured to determine the temperature of the exhaust stream,
      a second control valve disposed on the recycle line configured to control a volumetric flow rate of the exhaust stream,
      a temperature controller configured to receive a temperature signal from the temperature sensor, and to transmit a third output signal to the second control valve,
   wherein the temperature control unit is configured to control a temperature of the fuel stream based on the temperature of the exhaust stream.

5. The combustion system of claim 1, further comprising:
   a secondary heat exchanger disposed on the feed line and fluidly connected to the oxygen-depleted line, wherein the secondary heat exchanger is located upstream of the first inlet and downstream of the first outlet, and is configured to heat exchange the oxygen-containing stream with the oxygen-depleted stream that egresses the first outlet.

6. The combustion system of claim 1, further comprising:
   a condenser located downstream of and fluidly connected to the expander via the exhaust line configured to separate a liquid phase from the exhaust stream.

7. The combustion system of claim 1, wherein the combustor further comprises:
   a third concentric cylindrical zone sandwiched between the first and the second concentric cylindrical zones, defining a sweep zone; and
   a third inlet and a third outlet located in the sweep zone.

8. The combustion system of claim 7,
   wherein the recycle line fluidly connects the exhaust line to the third inlet.

9. The combustion system of claim 1, wherein the swirler comprises a plurality of the adjustable blades extending radially from a shaft, wherein each blade of the plurality of the adjustable blades has a longitudinal axis and an angle of the longitudinal axis of said each blade is adjustable relative to a longitudinal axis of the shaft.

10. The combustion system of claim 9, wherein the angle of the longitudinal axis of said each blade is adjustable in the range of 0 to 85 degrees relative to the longitudinal axis of the shaft.

11. The combustion system of claim 1, wherein the combustor further comprises
   a third concentric cylindrical zone which is sandwiched between the first and the second concentric cylindrical zones, defining a sweep zone, and
   a third inlet and a third outlet located in the sweep zone.

12. A process for combusting a fuel stream with a combustor comprising:

a cylindrical vessel with an internal cavity;

an ion transport membrane that divides the internal cavity of said cylindrical vessel into a first and a second concentric cylindrical tone, wherein the first concentric cylindrical zone is a feed zone and the second concentric cylindrical zone is a combustion zone;

a first inlet and a first outlet located in the feed zone, and a second inlet and a second outlet located in the combustion zone;

a swirler that is connected to the second inlet, wherein the swirler has adjustable blades with adjustable angles;

a third concentric cylindrical zone which is sandwiched between the first and the second concentric cylindrical zones, defining a sweep zone; and a third inlet and a third outlet located in the sweep zone, the process comprising:

combusting the fuel stream with molecular oxygen in the combustion zone to form an exhaust stream comprising water vapor and carbon dioxide;

delivering an oxygen-containing stream to the first inlet of the combustor, wherein molecular oxygen present in the oxygen-containing stream is transported to the sweep zone through the ion transport membrane;

flowing a portion of the exhaust stream into the third inlet of the combustor to sweep the molecular oxygen away from the sweep zone and to form an oxygen-enriched stream;

mixing the oxygen-enriched stream with the fuel stream in a mixer to form a combustion mixture; and delivering the combustion mixture to the second inlet of the combustor, wherein the combustion mixture is expanded and/or agitated in the combustion zone via the swirler and is combusted to form the exhaust stream; and repeating the flowing, the mixing, and the delivering.

13. The process of claim 12, wherein the fuel stream is a syngas stream.

14. The process of claim 12, further comprising:

expanding the exhaust stream in an expander to generate power.

15. The process of claim 12, further comprising:

adjusting the adjustable angles of the adjustable blades of the swirler based on a composition of the combustion mixture.

* * * * *